United States Patent
Kuespert

(10) Patent No.: US 10,914,860 B2
(45) Date of Patent: Feb. 9, 2021

(54) GAMMA RAY IMAGE LOGGING TOOL SENSOR PLACEMENT

(71) Applicant: Rock Visualization Technology, LLC, Oklahoma City, OK (US)

(72) Inventor: Jonathan Godard Kuespert, Oklahoma City, OK (US)

(73) Assignee: ROCK VISUALIZATION TECHNOLOGY, LLC, Oklahoma City, OK (US)

(*) Notice: Subject to any disclaimer, the term of this patent is extended or adjusted under 35 U.S.C. 154(b) by 0 days.

(21) Appl. No.: 16/292,073

(22) Filed: Mar. 4, 2019

(65) Prior Publication Data

US 2019/0204470 A1    Jul. 4, 2019

Related U.S. Application Data

(63) Continuation of application No. 15/841,067, filed on Dec. 13, 2017, now Pat. No. 10,473,812.

(60) Provisional application No. 62/434,162, filed on Dec. 14, 2016.

(51) Int. Cl.
*G01V 5/04* (2006.01)
*G01T 1/20* (2006.01)
*G01V 5/06* (2006.01)

(52) U.S. Cl.
CPC ............ *G01V 5/04* (2013.01); *G01T 1/20* (2013.01); *G01V 5/045* (2013.01); *G01V 5/06* (2013.01)

(58) Field of Classification Search
CPC ............ G01J 5/60; G01J 5/06; G01J 5/125
See application file for complete search history.

(56) References Cited

U.S. PATENT DOCUMENTS

| | | | |
|---|---|---|---|
| 2,316,361 A | 4/1943 | Piety | |
| 2,464,930 A | 3/1949 | Herzog | |
| 2,725,486 A | 11/1955 | Walstrom | |
| 2,967,933 A | 1/1961 | Scherbatskoy | |
| 4,286,217 A * | 8/1981 | Planche | G01V 3/20 324/347 |
| 4,297,575 A | 10/1981 | Smith, Jr. et al. | |
| 4,471,435 A | 9/1984 | Meisner | |
| 4,503,328 A | 3/1985 | Neufeld | |
| 4,585,939 A | 4/1986 | Arnold et al. | |

(Continued)

FOREIGN PATENT DOCUMENTS

| | | |
|---|---|---|
| EP | 0443936 A1 | 8/1991 |
| WO | 2015051287 A1 | 4/2015 |
| WO | 2016100755 A1 | 6/2016 |

OTHER PUBLICATIONS

International Search Report and Written Opinion dated Feb. 14, 2018 in PCT/US17/66203, Jonathan Godard Kuespert.

(Continued)

*Primary Examiner* — Yara B Green
(74) *Attorney, Agent, or Firm* — McAfee & Taft

(57) ABSTRACT

A method of creating a well image log of a cased well is provided. A passive cased well image logging tool assembly including a logging tool body, a plurality of gamma ray radiation sensor assemblies and a spatial positioning device is moved through at least a portion of the wellbore. Corrected gamma ray radiation data is vertically sampled. Based on the sampled data, a well image log is prepared. A passive cased well image logging tool assembly for use in a cased well is also provided.

54 Claims, 21 Drawing Sheets

(56) References Cited

U.S. PATENT DOCUMENTS

| | | | |
|---|---|---|---|
| 4,587,423 A | | 5/1986 | Boyce |
| 5,021,652 A | | 6/1991 | Arnold |
| 5,619,411 A | * | 4/1997 | Smith ................ G01V 5/12 702/8 |
| 6,026,911 A | | 2/2000 | Angle et al. |
| 6,088,294 A | | 7/2000 | Leggett, III et al. |
| 6,467,341 B1 | | 10/2002 | Boucher et al. |
| 6,766,855 B2 | | 7/2004 | Snoga |
| 6,997,257 B2 | | 2/2006 | Snoga |
| 7,000,700 B2 | | 2/2006 | Cairns et al. |
| 7,081,616 B2 | | 7/2006 | Grau et al. |
| 7,133,779 B2 | | 11/2006 | Tilke et al. |
| 7,254,486 B2 | | 8/2007 | Guo |
| 7,292,942 B2 | | 11/2007 | Ellis et al. |
| 7,414,405 B2 | | 8/2008 | Moore |
| 7,436,185 B2 | | 10/2008 | Fredette et al. |
| 7,763,845 B2 | | 7/2010 | Estes et al. |
| 8,210,625 B2 | | 6/2012 | Almaguer |
| 8,648,309 B2 | | 2/2014 | Smith, Jr. et al. |
| 2001/0041963 A1 | | 11/2001 | Estes et al. |
| 2003/0085707 A1 | | 5/2003 | Minerbo et al. |
| 2004/0020647 A1 | * | 2/2004 | Snoga ................ G01V 5/101 166/255.1 |
| 2005/0199794 A1 | | 9/2005 | Mickael |
| 2006/0149477 A1 | | 7/2006 | Cairns et al. |
| 2007/0144740 A1 | | 6/2007 | Guo et al. |
| 2009/0256080 A1 | | 10/2009 | DeVito |
| 2010/0314535 A1 | | 12/2010 | Zhang et al. |
| 2012/0186061 A1 | * | 7/2012 | Simonetti ............. C30B 11/00 29/428 |
| 2013/0261974 A1 | * | 10/2013 | Stewart ............. G01V 5/045 702/8 |
| 2014/0034821 A1 | | 2/2014 | Evans et al. |
| 2014/0374582 A1 | | 12/2014 | Guo et al. |
| 2016/0032717 A1 | | 2/2016 | Parker |
| 2016/0123137 A1 | | 5/2016 | Liu et al. |

OTHER PUBLICATIONS

International Search Report and Written Opinion dated Mar. 1, 2018 in PCT/US17/66156, Jonathan Godard Kuespert.

Crain, E.R., Analysis of Dipmeter Logs Part 1—Evolution of Dipmeter Tools, Spectrum 2000 Mindware Ltd., Calgary, AB Canada, Dipmeter Theory and Data Processing chapter of the Log Analysis Handbook, vol. 2, pp. 23-74, date unknown.

EILOG Express and Imaging Logging System, China Petroleum Technology & Development Corporation, downloaded from the Internet at http://www.cptdc.com:8080/dptdc/do/cptdc/cptdc~2000_2030~0~01-0102-21366-3000_1010-.

Younis, Shahbaz, Well Log (The Bore Hole Image) PowerPoint presentation, http/www.worldofteaching.com, date unknown.

Prosser, Jeremy et al., Early Dipmeters and New Tricks With Old Dips—Part 1, Task Geoscience, Aug. 17, 2011.

Borehole Imaging, http://petrowiki.org/Borehole_imaging, Jun. 8, 2016.

European Search report issued in corresponding European Patent Application No. 17881838.1 dated Jun. 17, 2020.

Fayer, M.J., et al., "Re-Evaluation of a Subsurface Injection Experiment for Testing Flow and Transport Models" XP55703146, published Feb. 1, 1995.

European Search report issued in corresponding European Patent Application No. 17880266.6 dated Jun. 19, 2020.

* cited by examiner

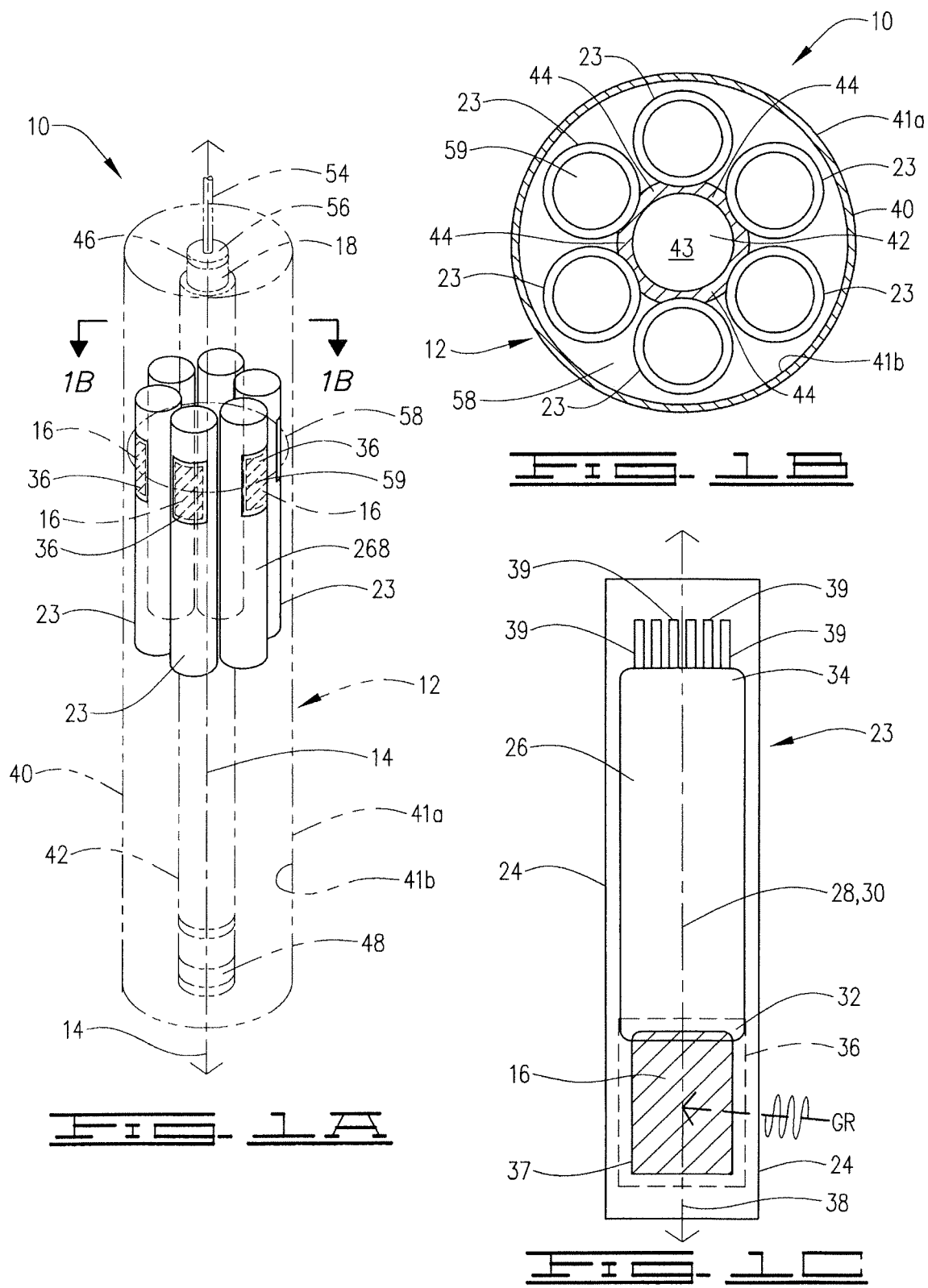

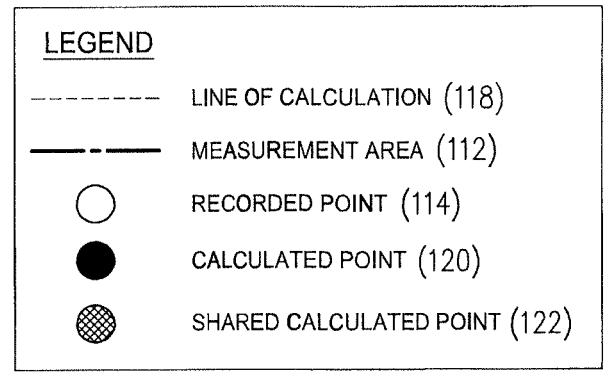
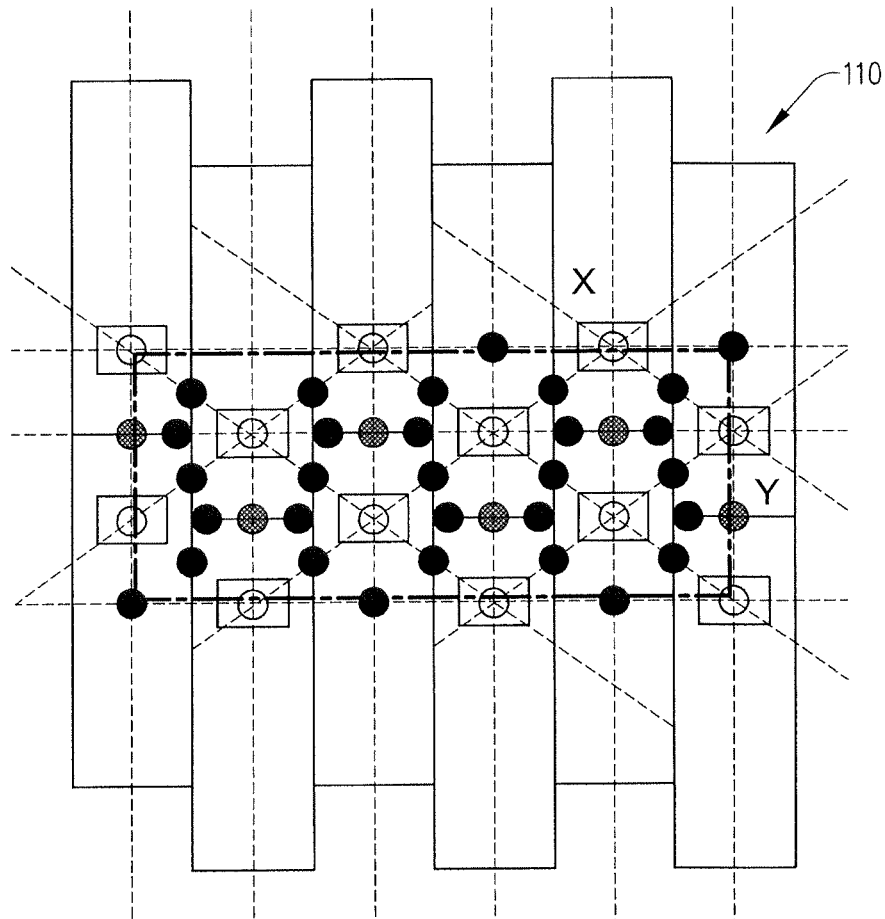
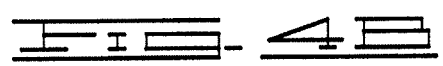

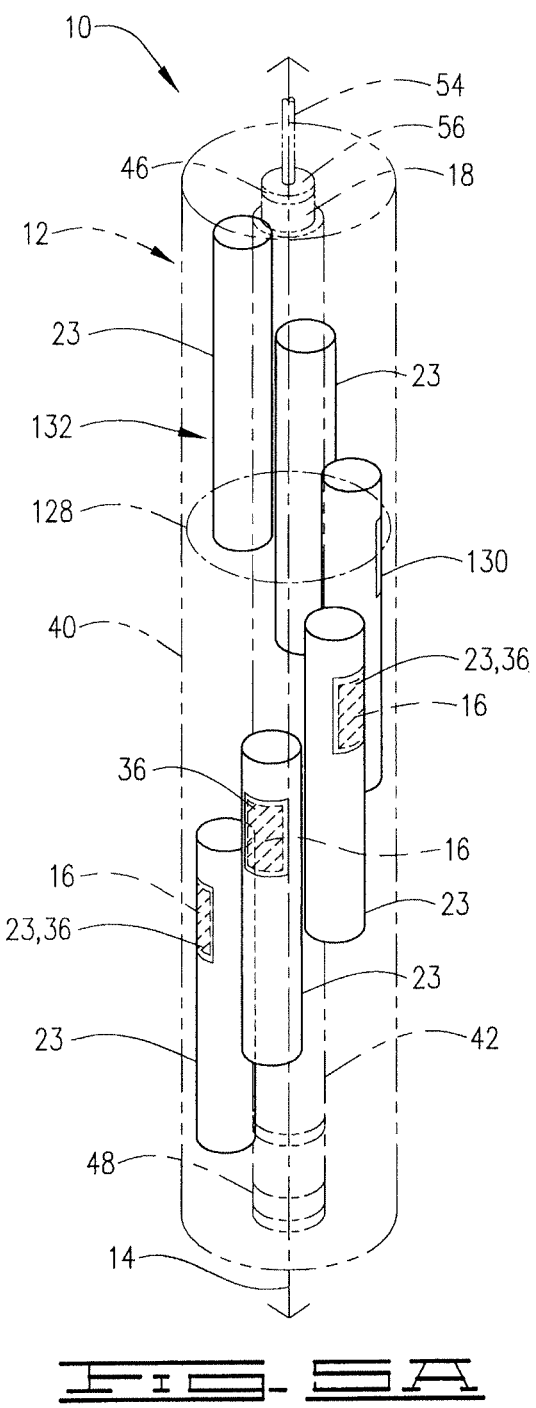
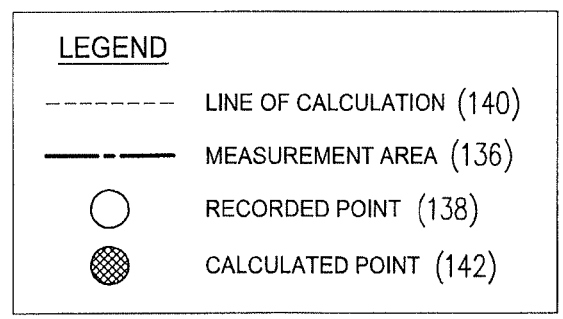
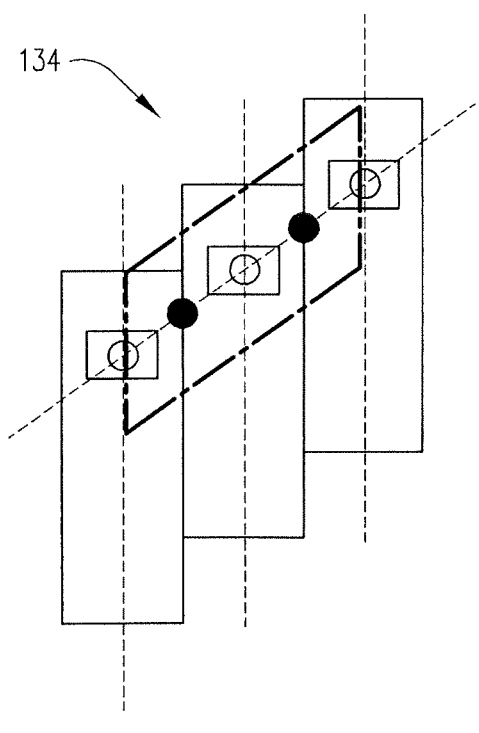
FIG. 5A
FIG. 5B

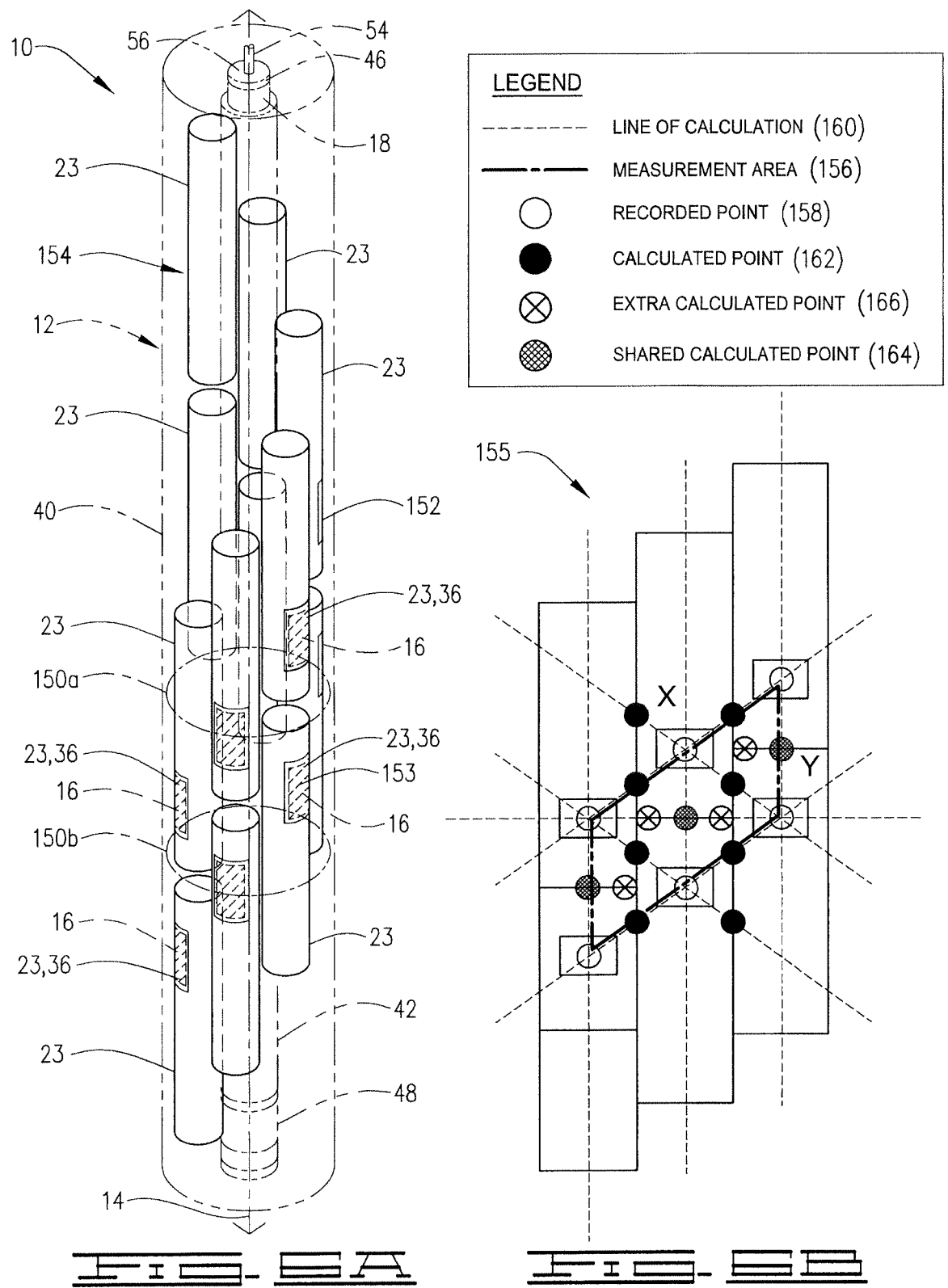

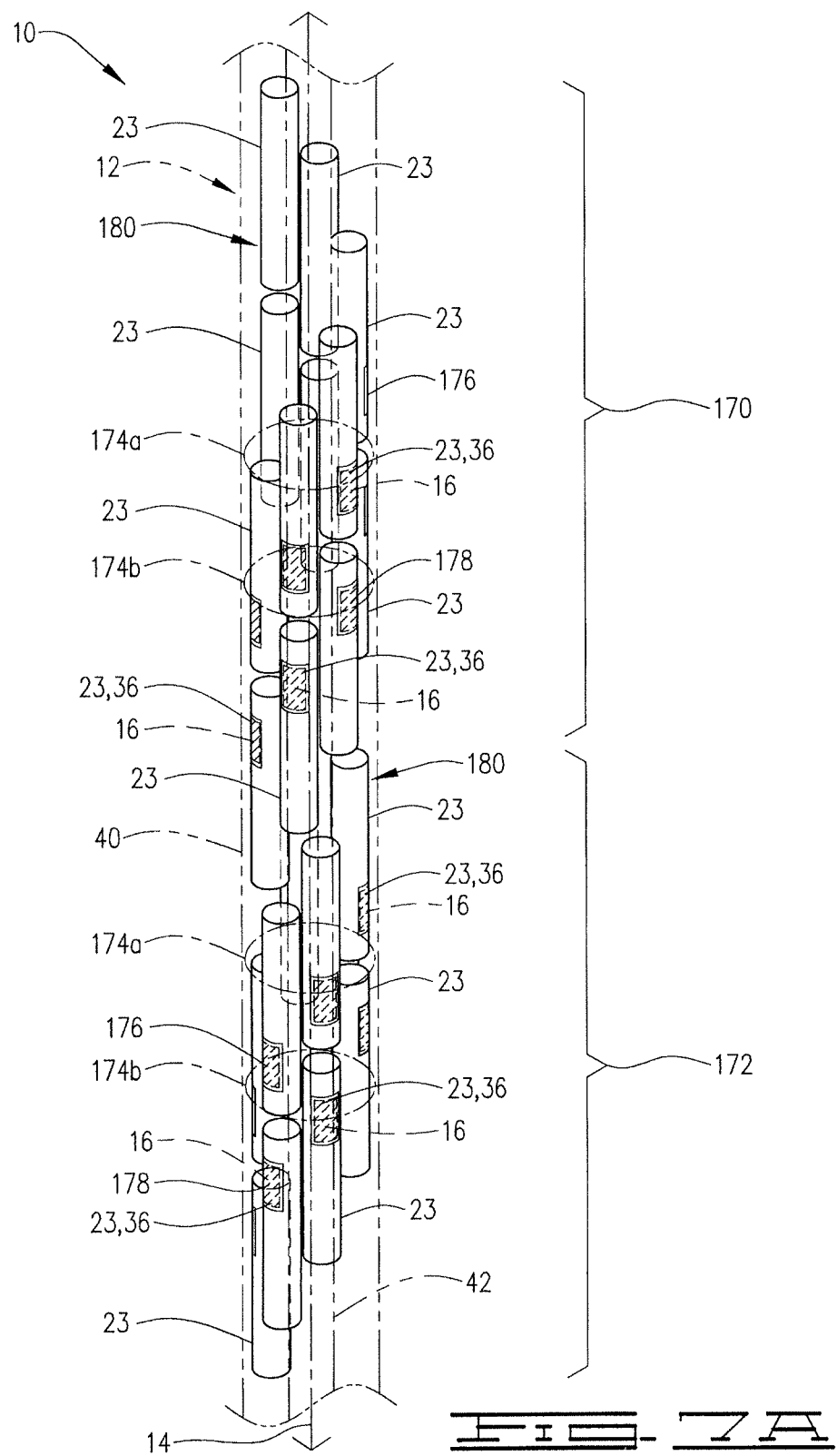

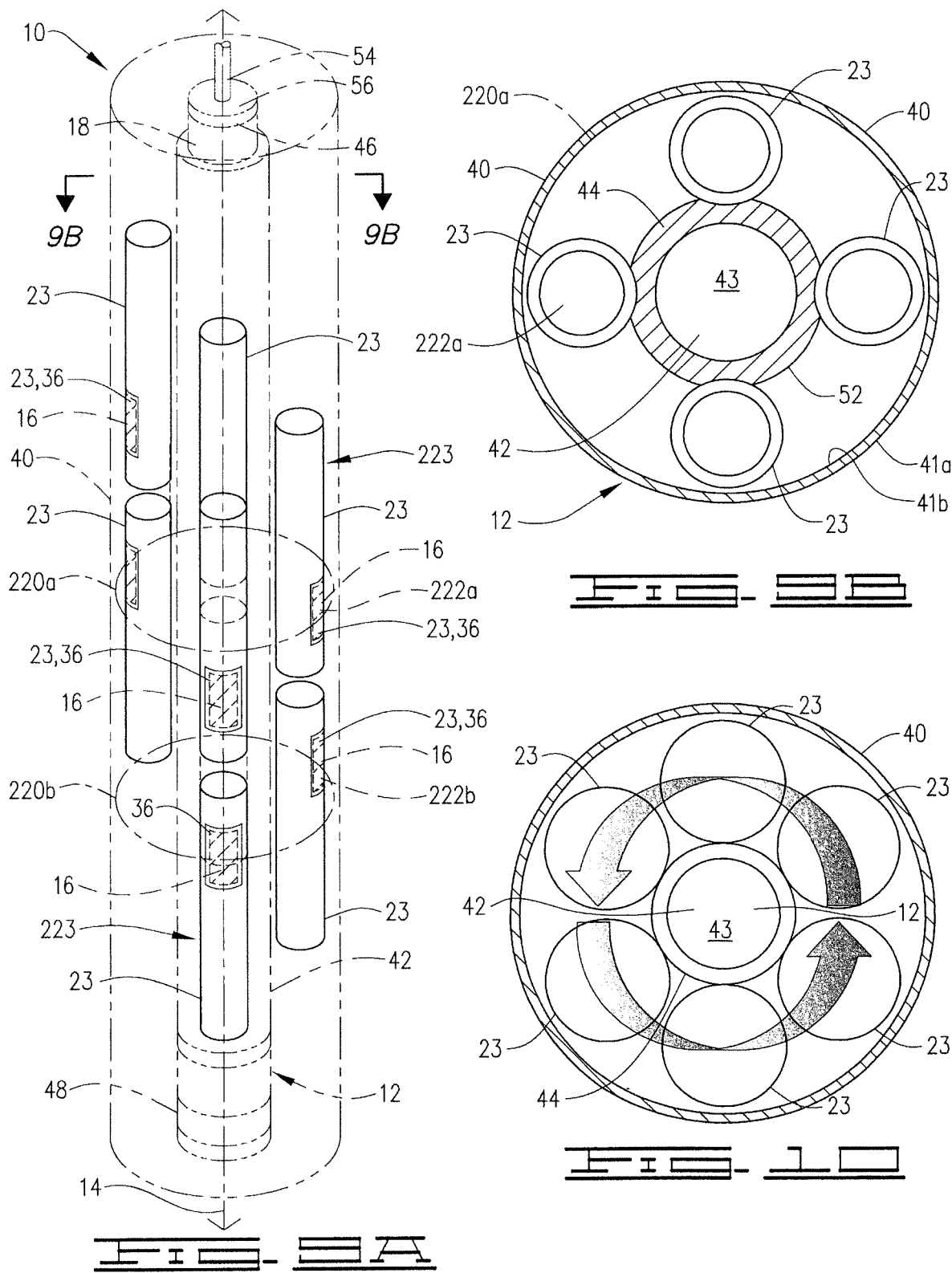

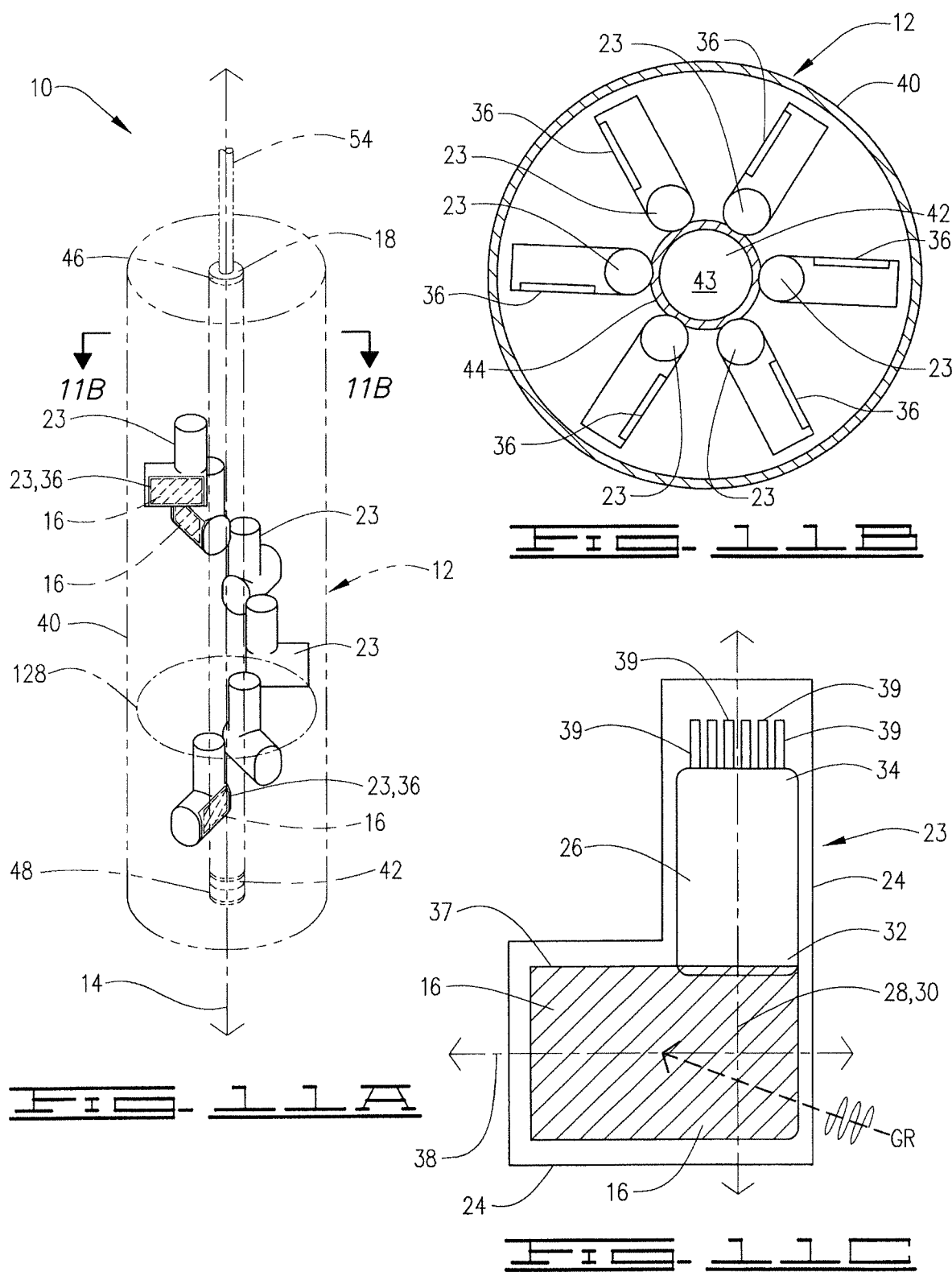

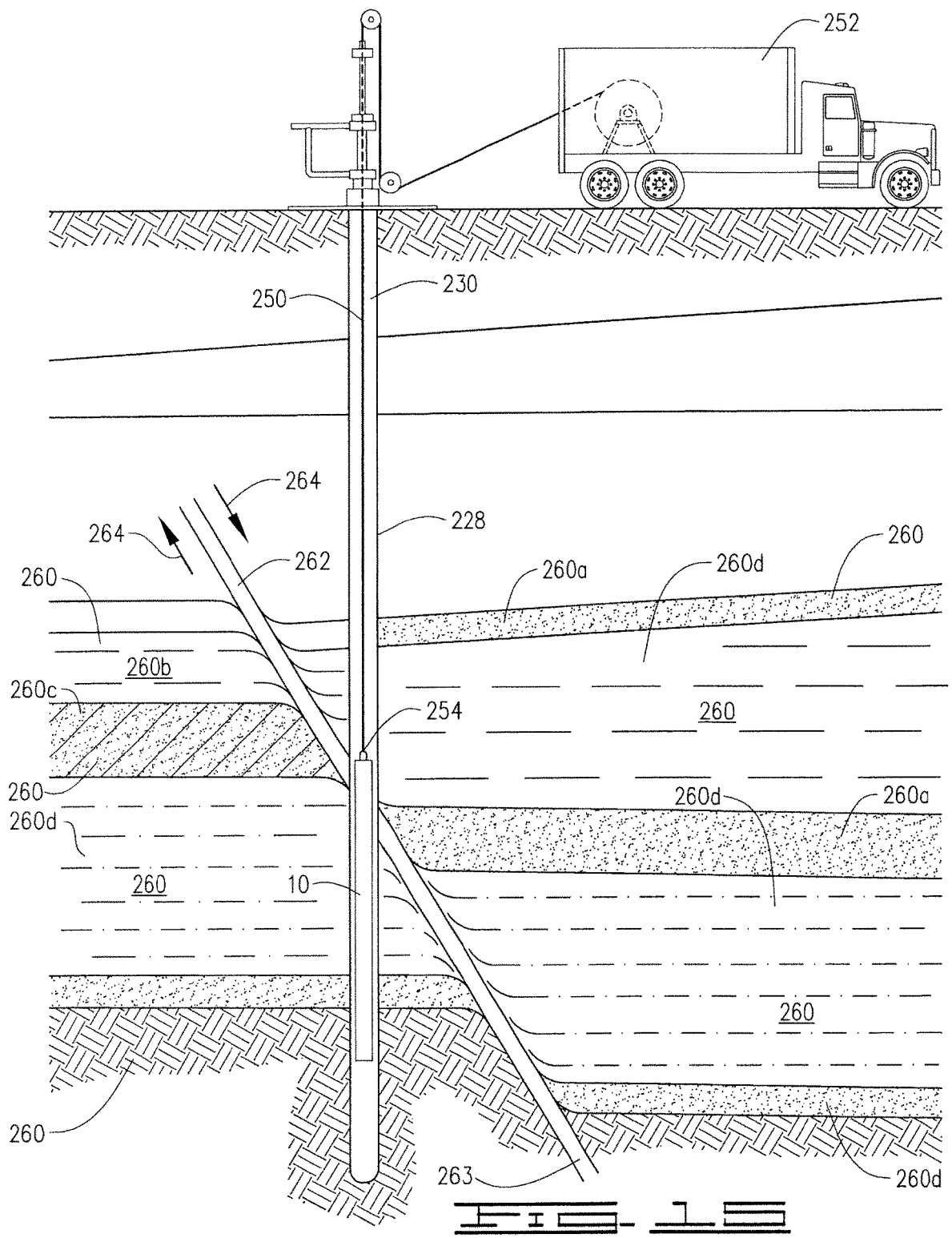

GAMMA RAY IMAGE LOGGING TOOL SENSOR PLACEMENT

BACKGROUND

An oil and gas well is created by drilling a wellbore on a desired surface site that extends from the surface to a certain depth or distance into the ground. The wellbore penetrates the underlying earth and various geologic units therein. With proper planning and placement, one or more of the geologic units penetrated by the wellbore will include commercial quantities of hydrocarbons such as oil and gas. The wellbore can extend vertically, at an angle and/or horizontally through the earth. For various reasons, including rock and drilling heterogeneities, the actual direction of a wellbore tends to deviate at least to some extent from the intended direction of the wellbore. Also, the diameter and roughness (or rugosity) of the resulting borehole typically changes as the wellbore is drilled because of similar rock and drilling heterogeneities.

As the wellbore is being drilled, a drilling fluid, also referred to as drilling mud, is continuously circulated from the surface through the wellbore and back to the surface. The drilling fluid functions to remove cuttings from the borehole, control formation pressure, and cool and lubricate the drill bit. After the wellbore is drilled to a certain or target depth, casing (typically metallic casing) is usually inserted and cemented in place in the now completed wellbore. The casing typically extends to the total depth of the wellbore. The casing isolates and seals off various geologic zones that have been penetrated by the wellbore and serves multiple other purposes. Cement material is usually injected around the casing and allowed to harden into an annular sheath around the casing. The cement sheath physically supports, positions and protects the casing in the wellbore and bonds the casing to the walls of the wellbore such that the undesirable migration of fluids between zones or formations penetrated by the wellbore is prevented.

After the wellbore is drilled to the desired depth and cased, the well is ready for the final completion and production phases. Final completion of the well includes the creation of one or more access conduits (for example, perforations) that extend through the casing and cement sheath to provide communication between the wellbore and one or more of the geologic units from which hydrocarbons are to be produced. The casing and cement sheath provide a solid support for the access conduits. Once the well is completed, the gas and/or fluids, which may include hydrocarbons and water, are produced or allowed to flow from the now completed geologic unit(s) into the wellbore and then to the surface where they are processed for future use.

Numerous important procedures are typically carried out on a well during the well drilling phase and before the well completion phase. One of these procedures involves gathering geologic and engineering data regarding the size and configuration of the borehole and the nature and characteristics of the surrounding geologic units. The collection of such data, typically referred to as well logging or formation logging, can be performed by one of several downhole methods within the uncased wellbore, including mud logging, wireline logging with a wireline cable, or using the bit assembly for measurement-while-drilling (MWD) or logging-while-drilling (LWD) techniques. Various specialized logging tools have been developed for use in connection with each method. The particular method and type of tools utilized will depend on several factors, including the borehole inclination and condition, costs and time, and the type of geologic units penetrated by the wellbore.

In one downhole logging method, a logging tool is attached to the end of a wireline cable and lowered to the desired depth in the wellbore (for example, to the bottom of the wellbore) and then pulled back to the surface at a set rate or speed (the "logging speed"). Data is collected as the tool is pulled back to the surface and transmitted through the cable to the surface. In lieu of the wireline cable, for example, another downhole tool can be used to lower the logging tool into the wellbore and pull the logging tool out of the wellbore. The data is usually collected in a spatially-corrected fashion to increase the amount of true signal over the background noise. In order to make it easier to use, the data is typically also sampled at a particular sampling rate.

Well logging tools have been around for decades. For example, when well logging first began in the early 1900's, only spontaneous or ionic potential and resistivity data was recorded. Today, there are many different types of logging tool configurations available. Examples include spontaneous potential logging tools, resistivity/conductivity logging tools, image logging tools, acoustic logging tools and density/neutron logging tools. Most of the available logging tools are limited to use in an open-hole environment, although certain types of resistivity/conductivity logging tools and density/neutron tools can be used in both an open hole and a cased hole environment. The type of data collected and the manner in which it is collected varies from tool to tool.

An example of a modern logging tool is an image logging tool. An image logging tool is used to produce "images" of the borehole wall and the surrounding geologic units penetrated by the wellbore. For example, an image logging tool can be used to identify the dip and azimuth of the geologic units around the wellbore, locate rock breakouts within the borehole, identify fractures in the surrounding geologic units and determine the composition of the surrounding geologic units. Based on the data collected, a useful well image log can be created that represents the surface of the surrounding geologic units in the wellbore.

There are many factors that can alter the quality of the data collected and recorded by an image logging tool, including the logging speed, the sampling rate, the rate of turning or spiraling of the logging tool in the hole, the borehole contact with the sensor assemblies, the proximity of the sensor assemblies to the rock surface, the borehole internal diameter, the borehole shape or rugosity, the borehole inclination, the radial arrangement of the sensor assemblies, the number and orientation of the sensor assemblies, and the sensitivity of the sensor assemblies. For example, the logging speed, sampling rate and orientation at which data is collected can be particularly important factors. Based on the dip and azimuth of the wellbore and the surrounding rock, it may be determined, for example, that the final location to which the wellbore is drilled needs to be changed and that the current wellbore needs to be re-drilled, or even that an additional wellbore needs to be drilled from a different location on the site in order to effectively and efficiently penetrate the most promising geologic unit(s).

Well logging tools, including image logging tools, can be classified in many ways, including but not limited to active vs. passive, pad vs. non-pad, statistical vs. non-statistical, and centered vs. offset or eccentric. For example, an active well logging tool emits a signal (for example, nuclear radiation, energy waves or high energy particles) into the wellbore and the surrounding geologic units in order to induce a return signal that can be received and recorded by the same tool for later processing into useful data. A passive well logging tool, on the other hand, merely receives emitted signals that contain the useful information from the geologic units penetrated by the wellbore. A passive well logging tool does not emit a signal into the wellbore or geologic units.

The types of image logging tools in use today include micro-resistivity logging tools, acoustic logging tools, and optical logging tools. All of these tools are suitable for use in an open-hole environment. A micro-resistivity image tool is an active, non-statistical image logging tool that measures the conductivity/resistivity of rock minerals, fluids, gases and other materials in a geologic unit. An acoustic image logging tool is an active, non-statistical image logging tool that uses sonic waves that reflect off rock, fluid and other material surfaces. An optical image logging tool is an active, non-statistical image logging tool that uses cameras to image the rock, fluid and other material surfaces. Micro-resistivity image logging tools are the most common and widespread image logging tool in use today. All the major logging vendors have at least one micro-resistivity imager in their portfolio.

A micro-resistivity image logging tool uses a signal transmitter to emit a measured amount of electrical current through the borehole wall into the geologic units surrounding the wellbore. Multiple signal transmitters positioned around the tool to cover the entire area surrounding the wellbore are typically used. The current emitted by each signal transmitter is altered by the conductivity/resistivity of the rock minerals, fluids, gases and other materials that are adjacent to the wellbore. The altered current is then received by a corresponding return signal sensor assembly attached to the logging tool. For example, the signal transmitters and return signal sensor assemblies can be placed in pads that are forced against the rock wall by extendable offset arms.

The time and distance interval between the emission of the current by each signal transmitter and the receipt of the altered current by the corresponding return signal sensor assembly together with the properties of the return signals such as their amplitudes and/or phases can be used to determine the conductivity/resistivity of the materials in the geologic units, that is, the ability of the materials to resist electrical currents. The resulting formation micro-resistivity can be recorded, for example, as a function of the tool's depth or position in the wellbore. This data is then later processed to create a micro-resistivity well image log showing different properties of the geologic units surrounding the wellbore.

For example, the recorded resistivity of the rock and other materials in the geologic units can be used to determine the nature of the rock and other materials. For example, the resistivity of shale is different than the resistivity of sand, and hydrocarbons and water will also impact the signal and resulting data. The resistivity data can be very valuable in the search for hydrocarbons and can dictate how the drilling and/or completion programs move forward.

A very important component of any image logging tool is the spatial control of where the transmitters and signals are oriented in xyz space relative to the wellbore and the Earth. As used herein and in the appended claims, the "Earth" means the planet Earth. Over the last several decades, tremendous advances have been made in this area with the use of gyroscopes mounted inside the logging tool. Gyroscopes allow the data to be corrected in xyz space relative to the wellbore and the Earth to greatly improve the data quality. The corrected data allows an image of the wellbore and the surrounding geologic units to be produced that can be "unwrapped" to create a two dimensional or three dimensional view of the inside of the wellbore. Such a well image log can provide information regarding, for example, the formation lithology, the nature of the bedding, the content of fluid in the formation, and the dip and azimuth of the surrounding rock. The ability to view processed data in two-dimensional or three-dimensional space reduces the impact of poor data collection or processing errors due to faulty receivers, hole washouts, excessive tool spinning, insufficient receivers, poor sampling or high logging speeds. Thus, the quality of the final well image log is significantly enhanced.

The ultimate goal of any image logging tool is to get an accurate representation of characteristics of the geologic units surrounding the wellbore. One measure of the quality of the representation that can be obtained is the signal-to-noise ratio (the "S/N ratio") associated with use of the tool. Both the rock being penetrated and the logging tool used to record the data create noise, most of which is random and cannot be easily eliminated. Reducing the noise and maximizing the signal strength associated with any well logging tool is a primary objective in the design and use of the tool. Maximizing the S/N ratio of an image logging tool will also improve the final product.

The S/N ratio associated with an image logging tool can be increased, for example, by decreasing the logging speed, using an eccentric, offset or off-center arrangement of transmitter/sensor assembly pads, moving the transmitter/sensor assembly pads closer to the wellbore wall, increasing the number of signal transmitters and corresponding signal sensor assemblies attached to the logging tool, acquiring data in more accurate three-dimensional xyz space, and then later processing the data better in three-dimensional xyz space.

Due to the low S/N ratio associated with cased wellbores, micro-resistivity, acoustic and optical image logging tools are typically only effective in an open-hole (non-cased) wellbore. For example, when a metal casing has been cemented in the wellbore, the metal in the casing interferes with the electrical, acoustic or optical signals being sent and received by the tool. The highly conductive nature of the metal casing creates "noise" that can overwhelm both the tool and the rock signal to and from the tool. A solid casing of any type can make optical image logging tools worthless in looking at geologic or engineering features in the surrounding formation. For example, solid plastic and composite casings are opaque in nature which can negatively impact the performance of optical image logging tools. Optical image logging tools are also negatively impacted by opaque or otherwise dirty drilling fluids, even in open holes.

Drilling rigs are very expensive to own, rent and operate. When a well is being drilled or a drilling rig is otherwise in place, time is money. As a result, a great deal of effort is made to keep the drilling and completion process moving forward in a timely and cost-effective fashion. However, many problems can come up that slow the process and cost the operator time and money. For example, getting a logging tool stuck in an open wellbore before casing has been run can be very time consuming and otherwise counterproductive. For example, logging tools are often "fished out" of the wellbore by specialized subcontractors who are brought out to the well site on a rush basis. Fishing a stuck logging tool out of the wellbore can take several days of rig and subcontractor time to accomplish. A stuck logging tool of the type that contains an active radioactive source can activate regulatory requirements that the well be abandoned and filled with red cement (the red cement warns subsequent well drillers to stay away from the buried active radioactive source).

Depending upon the regulatory environment associated with the well, most completed oil and gas wells are ultimately cased (typically with a metal casing). As a result, electrical, acoustic and optic-based image logging tools are only useful before the casing is installed.

The nature of an open-hole environment can also negatively impact the performance of an image logging tool. For example, excessive mud-cake buildup on the borehole wall can interfere with the signals being transmitted and received by an image logging tool. For example, a permeable rock zone that absorbs drilling fluid may result in a thicker mud-cake buildup than an adjacent low permeability zone. Also, the nature of the drilling fluid in the wellbore of an uncased hole can interfere with the signals being transmitted and received by an image logging tool. For example, highly resistive or conductive drilling mud, including commonly used oil-based muds, can be problematic for micro-resistivity image logging tools. Logging in an oil-based mud hole with a micro-resistivity image logging tool can require more complex data collection and processing.

Also, due to the fact that micro-resistivity, acoustic and optical image well logging tools can generally only be used to evaluate the geology in unprotected open-hole environments, the tools are typically designed to be pulled out of the hole by a wireline cable at a relatively high logging speed, for example, at a logging speed of at least 1000 feet per hour ("FPH"), usually at about 1800 FPH, and sometimes up to 3600 FPH. When a well is being drilled, it is always important to get the well cased and otherwise completed as soon as possible. This is due primarily to the daily cost of having a drilling rig in place (even if the drilling phase is complete, the drilling rig is still often used to complete the well). Also, in many wells, it is important to case the wellbore or one or more portions thereof quickly due to changing well conditions. For example, in some cases, the wellbore wall is sloughing or the stability of the geologic units around the wellbore is otherwise decreasing with time. In order to prevent the wellbore from collapsing or caving in, a well operator may decide that casing needs to be put in place sooner as opposed to later.

Also, in an open-hole environment, the likelihood that changing pressures, changing borehole shapes and other conditions will cause an image logging tool to get stuck increases significantly at slower logging speeds. This problem is exacerbated by the outwardly biasing extendable arms and corresponding pads of modern micro-resistivity image logging tools which make it easier for such tools to get hung up on the rock wall, for example, due to deviations ("dog-legs") in the inclination of the borehole. As a result, wireline logging engineers operating in open-hole environments are typically encouraged to use logging speeds of at least 1000 FPH and preferably 1,800 FPH.

Unfortunately, for a given image logging tool in a given wellbore environment, the quality of the logging data decreases as the logging speed at which the tool is run increases. A faster logging speed means a lower S/N ratio and less collected data. Less collected data means a lower quality final image log. In order to accommodate faster logging speeds and maximize image quality, image logging tool designers and manufacturers have increased the sophistication of the tools, including the number of pads and sensor assemblies on the tools, which allows a higher sampling rate to be used. Although this addresses the problem with low S/N ratios, it also significantly increases the cost of the tools. For example, a sophisticated micro-resistivity image logging tool can cost over $500,000 today.

The high cost of sophisticated modern image logging tools also creates problems in and of itself. For example, due to their high cost, micro-resistivity image logging tools are not widely available and can be in limited local supply. As a result, such tools may not be available to wireline logging engineers for use in a timely manner on a well. For example, additional planning and transportation costs may be incurred if the only available micro-resistivity image tool is located in another state.

The increased sophistication and capability of modern micro-resistivity image logging tools is not always needed. For example, in some cases, the well operator only needs or desires geologic unit dip and azimuth data. If this is the case, modern micro-resistivity image logging tools are used in a "dumbed-down" mode. In other words, the same expensive micro-resistivity image logging tool is run in the same deteriorating downhole environment and records the same data, but only part of the data is processed and presented. This is very wasteful of the data acquisition time and costs, particularly in view of the risk of placing such an expensive tool into poor wellbore conditions and thereby risking the tool being stuck.

SUMMARY

In one aspect, a method of creating a well image log of a cased well is disclosed herein. The method comprises providing a passive cased well image logging tool assembly, and moving the logging tool assembly through at least a portion of the wellbore. The logging tool assembly includes an elongated logging tool body having a central longitudinal axis, a plurality of gamma ray radiation sensors attached to the logging tool body and spaced around the central longitudinal axis of the logging tool body, each gamma ray radiation sensor being capable of continuously collecting gamma ray radiation data from one or more geologic units surrounding or adjacent to the wellbore as the logging tool assembly is moved through the wellbore, and at least one spatial positioning device attached to the logging tool body that is capable of continuously collecting sensor position data reflecting the xyz spatial position of the gamma ray radiation sensors in the wellbore relative to the wellbore and the Earth as the logging tool assembly is moved through the wellbore. The method further comprises: as the logging tool assembly is being moved through the wellbore, using the gamma ray radiation sensors to continuously collect gamma ray radiation data that is emitted by the geologic unit(s); as the logging tool assembly is being moved through the wellbore, using the spatial positioning device to continuously collect sensor position data reflecting the xyz spatial position of the gamma ray radiation sensors within the wellbore relative to the wellbore and the Earth; using the collected sensor position data to correct the collected gamma ray radiation data; sampling the corrected gamma ray radiation data; and preparing a well image log based on the sampled gamma ray radiation data. For example, the gamma ray radiation sensors can be attached to and equally spaced around the central longitudinal axis of the logging tool body.

In another aspect, a passive cased well image logging tool assembly for use in a cased well is disclosed herein. The passive cased well image logging tool assembly comprises: an elongated logging tool body having a central longitudinal axis; a plurality of gamma ray radiation sensors attached to the logging tool body and spaced around the central longitudinal axis of the logging tool body, and at least one spatial positioning device attached to the logging tool body. Each gamma ray radiation sensor is capable of continuously collecting gamma ray radiation data from one or more geologic units surrounding or adjacent to the wellbore as the logging tool assembly is moved through the wellbore. The spatial positioning device is capable of continuously collecting sensor position data reflecting the xyz spatial position of the gamma ray radiation sensors in the wellbore relative to the wellbore and the Earth as the logging tool assembly is moved through the wellbore. For example, the gamma ray radiation sensors can be attached to the logging tool body and equally spaced around the central longitudinal axis of the logging tool body.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure. Also, the various views in the drawings are shown in different scales in order to illustrate the invention and are not representative of the size of the actual logging tool and components thereof that are disclosed herein. As used herein, terms of orientation such as vertical, horizontal, outwardly, inwardly, downwardly and upwardly with respect to the logging tool assembly disclosed herein are to be construed in view of the manner in which the logging tool assembly is positioned and oriented in the drawings.

FIG. 1A is a perspective view of one embodiment of the passive cased well image logging tool assembly disclosed herein.

FIG. 1B is a cross-sectional view taken along the lines 1B-1B of FIG. 1A.

FIG. 1C is an enlarged sectional view of one of the sensor assemblies illustrated by FIGS. 1A and 1B.

FIG. 4B is a plan view in the form of a diagram illustrating sensor assembly data recorded points and calculated points from eight of the twelve sensor assemblies associated with the logging tool shown by FIG. 4A.

FIG. 5A is a perspective view of another embodiment of the passive cased well image logging tool assembly disclosed herein.

FIG. 5B is a plan view in the form of a diagram illustrating sensor assembly data recorded points and calculated points from three of the six sensor assemblies associated with the logging tool shown by FIG. 5A.

FIG. 6A is a perspective view of another embodiment of the passive cased well image logging tool assembly disclosed herein.

FIG. 6B is a plan view in the form of a diagram illustrating sensor assembly data recorded points and calculated points from six of the twelve sensor assemblies associated with the logging tool shown by FIG. 6A.

FIG. 7A is a perspective view of another embodiment of the passive cased well image logging tool assembly disclosed herein.

FIG. 9A is a perspective view of another embodiment of the passive cased well image logging tool assembly disclosed herein.

FIG. 9B is a cross-sectional view taken along the lines 9B-9B of FIG. 9A.

FIG. 10 illustrates the flow of wellbore fluid around and through the logging tool assembly when a helical arrangement of sensor assemblies and sensors is utilized in association with the logging tool assembly disclosed herein.

FIG. 11A is a side view illustrating an alternative embodiment of the sensor assemblies with respect to the logging tool body of the logging tool assembly disclosed herein.

FIG. 11B is a cross-sectional view taken along the lines 11B-11B of FIG. 11A.

FIG. 11C is an enlarged sectional view of one of the sensor assemblies illustrated by FIG. 11A.

FIG. 15 is a schematic view illustrating use of all embodiments of the passive cased well image logging tool assembly disclosed herein shown in association with one embodiment of the method disclosed herein.

DETAILED DESCRIPTION

Figure 2A:
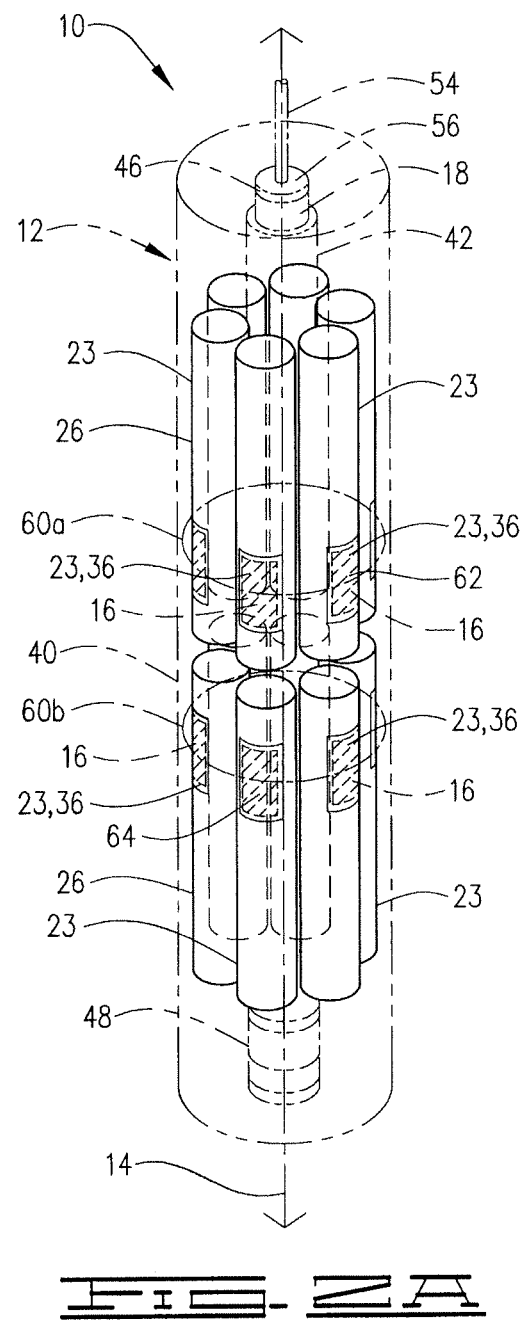
FIG. 2A is a perspective view of another embodiment of the passive cased well image logging tool assembly disclosed herein.

The present disclosure may be understood more readily by reference to this detailed description. Numerous specific details are set forth in order to provide a thorough understanding of the various embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

In one aspect, this disclosure provides a method of creating a well image log of a cased well. In another aspect, this disclosure provides a passive cased well image logging tool assembly for use in a cased well. For example, the passive cased well image logging tool assembly disclosed herein can be the passive cased well image logging tool assembly used in the method of creating a well image log of a cased well disclosed herein.

In one embodiment, the method of creating a well image log of a cased well disclosed herein comprises:
a. providing a passive cased well image logging tool assembly, the logging tool assembly including:
   an elongated logging tool body having a central longitudinal axis;
   a plurality of gamma ray radiation sensors attached to the logging tool body and spaced around the central longitudinal axis of the logging tool body, each gamma ray radiation sensor being capable of continuously collecting gamma ray radiation data from one or more geologic units surrounding or adjacent to the wellbore as the logging tool assembly is moved through the wellbore; and
   at least one spatial positioning device attached to the logging tool body that is capable of continuously collecting sensor position data reflecting the xyz spatial position of the gamma ray radiation sensors in the wellbore relative to the wellbore and the Earth as the logging tool assembly is moved through the wellbore;
b. moving the logging tool assembly through at least a portion of the wellbore;
c. as the logging tool assembly is being moved through the wellbore, using the gamma ray radiation sensors to continuously collect gamma ray radiation data that is emitted by the geologic unit(s);
d. as the logging tool assembly is being moved through the wellbore, using the spatial positioning device to continuously collect sensor position data reflecting the xyz spatial position of the gamma ray radiation sensors within the wellbore relative to the wellbore and the Earth;
e. using the collected sensor position data to correct the collected gamma ray radiation data;
f. sampling the corrected gamma ray radiation data; and
g. preparing a well image log based on the sampled gamma ray radiation data.

As used herein and in the appended claims, a "well" means a drilled wellbore and the geologic units surrounding or adjacent to the wellbore. The terms "wellbore" and "borehole" are used interchangeably and mean the same thing. A "cased well" means a well in which the wellbore or a section thereof contains an annular casing (for example, an annular metal casing). A "well image log" means a well log including an image of all or a portion of a borehole wall and all or a portion of one or more geologic units surrounding or adjacent to the wellbore. The well image log can be used to create a separate dipmeter log.

For example, the passive cased well image logging tool assembly used in the method disclosed herein can be the passive cased well image logging tool assembly disclosed herein and further described below. As used herein and in the appended claims, a "passive" cased well image logging tool assembly means a cased well image logging tool assembly that collects data from one or more geologic units surrounding or adjacent to a wellbore but does not emit a signal into the wellbore or the geologic unit(s). Unless stated otherwise, one element "attached to" another element means the one element is directly or indirectly attached to, or incorporated into, the other element.

As used herein and in the appended claims, "collecting" data means receiving the data and transmitting the received data to another component. Receiving data, sensing data, and detecting data mean the same thing and may be used interchangeably herein. Transmitting the received data to another component includes allowing or causing the received data to pass to another component. For example, the other component can be a photomultiplier tube, a signal processing unit, a memory device for storing data, or a relay. The other component can be located in the logging tool assembly itself or at another location (for example, on the surface).

For example, "collecting" gamma ray radiation data means receiving gamma ray radiation data naturally emitted from a geologic unit surrounding or adjacent to the wellbore, and transmitting the received data to another component. For example, gamma ray radiation data can be transmitted by a gamma ray radiation sensor to a photomultiplier tube in which the data signal is amplified. For example, gamma ray radiation data can be transmitted by a gamma ray radiation sensor to a relay in the logging tool assembly and by the relay to a signal processing unit on the surface.

For example, "collecting" sensor position data means receiving sensor position data reflecting the xyz spatial position of the gamma ray radiation sensors in the wellbore relative to the wellbore and the Earth, and transmitting the received sensor position data to another component. For example, sensor position data can be transmitted by the spatial positioning device to a relay in the logging tool assembly and by the relay to a signal processing unit on the surface.

For example, the signal processing unit, wherever it is located, can record (for example, store) the data and/or process it for further use. For example, the signal processing unit can be or include a central processing unit. The signal processing unit can be attached to the logging tool assembly, attached to another downhole tool, located on the surface of the well site associated with the well or located in a remote location.

As used herein and in the appended claims, "gamma ray radiation" means gamma radiation arising from the radioactive decay of atomic nuclei. Gamma ray radiation includes gamma ray radiation that is naturally emitted from one or more geologic units surrounding or adjacent to the wellbore. Gamma rays consist of high energy protons and have short wavelengths, for example, less than one-tenth of a nanometer. Gamma ray radiation can be created by various sources including naturally occurring rock radioisotopes. Natural gamma rays can vary depending upon the type of element from which they are emitted. For example, different types of rock and other materials in a geologic unit emit different amounts and different spectra of natural gamma ray radiation. Examples of common naturally occurring rock radioisotopes in geologic units penetrated by wellbores include natural radioisotopes of uranium (U), potassium (K), and thorium (Th).

Gamma ray radiation is usually expressed in the oil and gas industry in API (American Petroleum Institute) units or in parts per million (ppm). For example, the total gamma ray radiation emission from a geologic unit or portion thereof from natural radioisotopes of uranium, potassium, and thorium is typically expressed in API units. For standard gamma ray logs, the individual gamma ray radiation emissions from thorium and uranium radioisotopes in the geologic unit or portion thereof are typically expressed in parts per million, while the individual gamma ray radiation emission from potassium radioisotopes is typically expressed in terms of its bulk rock percentage. For example, the total gamma ray emission as well as the individual gamma ray emissions from thorium, uranium and potassium radioisotopes in a geologic unit or portion thereof can be collected by the logging tool assembly in accordance with the method disclosed herein.

According to an Oilfield Glossary provided by Schlumberger at "www.glossary.oilfield.slb.com" at the time of filing this application, an API unit is defined as:

"The unit of radioactivity used for natural gamma ray logs. This unit is based on an artificially radioactive concrete block at the University of Houston, Tex., USA, that is defined to have a radioactivity of 200 American Petroleum Institute (API) units. This was chosen because it was considered to be twice the radioactivity of a typical shale. The formation is the primary standard for calibrating gamma ray logs. However, even when properly calibrated, different gamma ray tools will not necessarily have identical readings downhole because their detectors can have different spectral sensitivities. They will read the same only if the downhole formation contains the same proportions of thorium, potassium and uranium as the Houston standard. For example, logging while drilling (LWD) tools have thicker housings than wireline tools, causing a different spectral response to the three sources of radioactivity, and therefore a different total gamma ray reading in some formations. The nuclear well log calibration facility at the University of Houston, known as the API pits, was opened in 1959 for the calibration of natural gamma ray and neutron logs. A facility for calibrating natural gamma ray spectroscopy logs was added later."

In connection with the method disclosed herein, the relative changes in the gamma ray values (in API units) with respect to gamma ray radiation emitted by a geologic unit are most important. The absolute values (in API units) of the gamma ray radiation emitted by the geologic units are not as important.

As used herein and in the appended claims, "gamma ray radiation data" means data regarding one or more properties of gamma rays emitted from one or more geologic unit(s) surrounding or adjacent to the wellbore. In accordance with the method disclosed herein, gamma ray radiation data can be continuously collected by the gamma ray radiation sensors. For example, the gamma ray radiation data that is continuously collected by the gamma ray radiation sensors is naturally emitted by the geologic unit(s).

Naturally occurring gamma ray radiation data can be analyzed to characterize, for example, rock or sediment in the geologic unit(s) surrounding or adjacent to the wellbore. Types of gamma ray radiation data that can be collected by the logging tool assembly in accordance with the method disclosed herein include the total natural gamma ray radiation emitted from a geologic unit or portion thereof, the individual energy profiles corresponding to the types of radioisotope elements (thorium, uranium and potassium) naturally emitting the gamma ray radiation and the intensity or magnitude of the gamma ray radiation. For example, the distance between the point of emission of the natural gamma ray radiation in the geologic unit and the gamma ray radiation sensor assembly of the logging tool assembly that receives the emission can be collected as well. For example, the absolute value of a change in the intensity of the gamma ray radiation emitted from point to point in a geologic unit is as important as the magnitude of that change.

For example, shales usually emit more gamma rays than sands, sandstone and carbonate rocks because radioactive potassium is a common component in their clay content. The clay in shales also often contains a higher amount of uranium and thorium isotopes. For example, black shale rich in organic compounds may emit far more gamma rays than clean sand because black shale rich in organic compounds has a higher uranium content than sand. The following table shows typical gamma ray responses for different types of rocks, as expressed in API units:

| GAMMA RAY RESPONSE IN DIFFERENT ROCKS AND MINERALS (Expressed in API units) | |
| --- | --- |
| Type of Rock or Other Element | Typical Gamma Ray Values (API Units) |
| Limestone | 10-30 |
| Organic-rich shale | 70-250 |
| Sandstone | 10-60 |
| Salt | 2-20 |
| Shale | 70-90 |

As used herein and in the appended claims, the term "rock" includes rock, sediment, minerals and other elements in a geologic unit.

The gamma ray radiation data collected by the logging tool assembly in accordance with the method disclosed herein can be corrected, correlated and used to create useful well image logs. For example, the well image log prepared in accordance with the method disclosed herein can be a spectral gamma ray log. For example, the well image log prepared in accordance with the method disclosed herein can be a spectral gamma ray log with uranium, potassium and/or thorium responses; i.e., composed of uranium, potassium and/or thorium data. The ability to differentiate between the sources of the gamma ray radiation naturally emitted from one or more geologic units allows spectral gamma ray logs to be created. For example, in a spectral gamma ray log, the total gamma ray response can be placed in the left column, and the separate responses from potassium, uranium and thorium radioisotopes can be placed in the right column. For example, the orientation and intensity/magnitude of the gamma ray radiation can be used to determine the nature of the materials in the geologic unit at each point in the unit from which the radiation is measured.

In addition to collecting gamma ray radiation data that is naturally emitted from one or more geologic units surrounding or adjacent to the wellbore, the well logging tool assembly used in the method disclosed herein can collect gamma ray radiation data emitted by radioactive tracers that have been injected into the wellbore to provide a way to analyze the placement and flow of fluids and materials in a geologic unit. For example, such gamma ray radiation data can be used to determine where a frac job has gone or where production is coming from in a subterranean formation.

As used herein and in the appended claims, a gamma ray radiation sensor means a receiver, sensor, detector, or other device that is capable of collecting gamma ray radiation data that is emitted from a geologic unit surrounding or adjacent to a wellbore. For example, one or more of the gamma ray radiation sensors of the logging tool assembly disclosed herein can be scintillation detectors or counters configured to measure the number and energy of gamma rays.

As another example, one or more of the gamma ray radiation sensors of the logging tool body disclosed herein can include crystal semiconductors formed of crystals having known properties that respond to gamma rays. For example, semiconductors formed of bismuth geranium crystals, gadolinium oxyorthosilicate crystals, cerium doped lutetium oxyorthosilicate crystals, thallium impurity, "NaI (TI)" doped sodium iodide crystals, and any combination thereof can be used. Crystal semiconductors can have better intrinsic energy resolution than scintillators with respect to gamma ray radiation. For example, the gamma ray radiation sensor assemblies can detect gamma rays from isotope tracers, including Scandium 46, Antimony 124, and Iridium 192.

For example, each of the gamma ray radiation sensors of the logging tool assembly disclosed herein can be a scintillation crystal. For example, each of the sensors can be part of a sensor assembly that includes a housing and a photomultiplier tube associated with the sensor, wherein the sensor is contained by the housing. For example, both the sensor and the photomultiplier tube can be contained by the housing. For example, the photomultiplier tube can include a central longitudinal axis, a first end, and a second end, wherein the sensor is attached to one end of the photomultiplier tube.

As used herein and in the appended claims, "sensor position data" means data that reflects the xyz spatial position of the gamma ray radiation sensor in the wellbore relative to the wellbore and the Earth as the logging tool assembly is moved through the wellbore. A "spatial positioning device" means a device that is capable of continuously collecting sensor position data. The spatial positioning device functions to orient the gamma ray radiation data collected by the well logging tool assembly into xyz space relative to the logging tool body. For example, the spatial positioning device can be used to correct the collected gamma ray radiation data to xyz space relative to the wellbore and the Earth. For example, the spatial positioning device allows for proper spatial xyz placement of the collected data. The correction process significantly improves the quality of the data provided by the logging tool assembly as well as the quality of the subsequently processed data.

For example, the spatial positioning device can be a gyroscope. If desired, two or more gyroscopes or other spatial positioning devices can be attached to the logging tool body. Suitable gyroscopes for use in connection with the logging tool assembly disclosed herein are available from several vendors. One example of a suitable gyroscope device is sold by Scientific Drilling as a Gyro Measurement-While-Drilling (gyroMWD™) system. Another example of a suitable gyroscope device sold by Scientific Drilling is a "Keeper Gyro™."

In accordance with the method disclosed herein, various additional corrections can be made to the gamma ray radiation data to make it more accurate. For example, the method disclosed herein can further comprise processing the collected gamma ray radiation data to correct the data to account for the rugosity of the borehole, the thickness of the casing and optionally other parameters. For example, the rugosity of the borehole and the thickness of the casing and optionally one or more additional parameters can also be sensed by the well logging tool assembly disclosed herein or obtained from known data sources and used by the well logging tool assembly, together with the collected gamma ray radiation data, to correct the gamma ray radiation data.

As used herein and in the appended claims, the "logging speed" at which the logging tool assembly is moved through the wellbore (or a portion thereof) means the rate at which the logging tool assembly (including the sensor assemblies and other components attached thereto) is moved through the wellbore (or a portion thereof) in terms of distance units per time units, for example, the number of feet per hour ("FPH") that the logging tool is moved through the wellbore. Any logging speed used in connection with open well logging tools, as known to those skilled in the art with the benefit of this disclosure, can be used in association with the method disclosed therein. However, due to the fact that the well is cased, the logging tool assembly used in connection with the method disclosed herein can be moved through the wellbore (or a portion thereof) at a significantly slower logging speed than the logging speeds typically used in association with open hole environments.

For example, in accordance with the disclosed method, the logging tool assembly can be moved through at least a portion of the wellbore (or all of the wellbore) at a logging speed that is no greater than 750 FPH. For example, the logging tool assembly used in the method disclosed herein can be moved through at least a portion of the wellbore (or all of the wellbore) at a logging speed in the range of from about 30 FPH to about 600 FPH. For example, the logging tool assembly can be moved through at least a portion of the wellbore (or all of the wellbore) at a logging speed in the range of from about 60 FPH to about 300 FPH. For example, the logging tool assembly can be moved through at least a portion of the wellbore (or all of the wellbore) at a logging speed in the range of from about 120 FPH to about 180 FPH. For example, the logging tool assembly can be moved through at least a portion of the wellbore (or all of the wellbore) at a logging speed in the range of from about 160 FPH to about 170 FPH. For example, the logging tool assembly can be moved through at least a portion of the wellbore (or all of the wellbore) at a logging speed of about 165 FPH.

The fact that the wellbore is cased allows a slower logging speed to be safely used. For example, due in large part to the fact that a drilling rig is usually no longer required, the cost of creating the well image log in a cased hole environment is significantly lower than it would be in an open hole environment. The ability to run the tool at a slower logging speed means a higher sampling rate can be used which means that more gamma ray radiation data can be collected with a less complex logging tool assembly (for example, as compared to modern micro-resistivity, acoustic or optical image logging tool assemblies).

For example, the corrected gamma ray radiation data can be vertically sampled by the signal processing unit or another component. The signal processing unit or other component can be located in the logging tool assembly itself or at another location (for example, as or as part of a central processing unit on the surface). The corrected gamma ray radiation data can be vertically sampled either as the method is carried out or at another time.

As used herein and in the appended claims, "vertically sampling" the corrected gamma ray radiation data means sampling the corrected gamma ray radiation data along the longitudinal axis of the wellbore. As understood by those skilled in the art, the longitudinal axis of the wellbore is not necessarily vertical—it can be horizontal or deviated at some angle between vertical and horizontal, either away from the surface or toward the surface. Accordingly, as used in the term "vertical sampling," the term "vertical" has no meaning other than along the longitudinal axis of the wellbore. The dimension in which the vertical sampling is carried out can be distance, time or some other dimension.

For example, the dimension in which the vertical sampling is carried out can be distance. As used herein and in the appended claims, the term "vertical distance sampling rate" means the rate at which samples of the data are taken with respect to the vertical distance sampling interval. The "vertical distance sampling interval" means the distance that the logging tool assembly moves through the wellbore for every sample that is collected. For example, if S represents the continuous stream of corrected gamma ray radiation data transmitted by the spatial positioning device, D represents the vertical distance sampling interval and the vertical sampling is performed by measuring the value of the S once every D inches, then the vertical distance sampling rate, R(d), at which the vertical sampling of S is carried out can be represented by the formula $R(d)=1/D$. Accordingly, if D is 1.75 inches, then R(d), is 0.57. For example, D is no greater than six inches. For example, D is no greater than 1.75 inches. For example, D is in the range of from about 0.5 inches to 1.75 inches. For example, D can be in the range of from about 0.5 inches to about 1 inch.

For example, the dimension in which the vertical sampling is carried out can be time. As used herein and in the appended claims, the term "vertical time sampling rate" means the rate at which samples of the data are taken with respect to the vertical time sampling interval. The "vertical time sampling interval" means the time that the logging tool assembly moves through the wellbore for every sample that is collected. For example, if S represents the continuous stream of corrected gamma ray radiation data transmitted by the spatial positioning device, T represents the vertical time sampling interval and the vertical sampling is performed by measuring the value of the S once every T second, then the vertical time sampling rate, T(d), at which the vertical sampling of S is carried out can be represented by the formula $T(d)=1/T$. Accordingly, if T is 1.14 seconds, then the time vertical sampling rate, T(d), is 0.88. For example, T can be in the range of from about 0.25 seconds to about 20.0 seconds. For example, T can be in the range of from about 0.5 seconds to about 10.0 seconds. For example, T can be in the range of from about 0.6 seconds to about 4.0 seconds. For example, T can be in the range of from about 0.90 seconds to about 1.30 seconds. For example, T can be about 1.14 seconds.

The specific vertical sampling rate(s) utilized in a given survey, whether expressed in terms of distance, time or some other dimension, will vary depending on the logging speed used, the rock type, the wellbore geometry, the required accuracy and other factors as known to those skilled in the art with the benefit of this disclosure. For example, a statistically significant vertical sampling rate can be used.

The corrected gamma ray radiation data can also be horizontally sampled. Unlike vertical sampling, which collects data at points along or parallel to the longitudinal wellbore axis, horizontal sampling collects data at points outwardly and around with respect to the longitudinal wellbore axis (for example, perpendicularly or at some other angle with respect to the longitudinal wellbore axis). As understood by those skilled in the art, the longitudinal axis of the wellbore is not necessarily vertical—it can be horizontal or deviated at some angle between vertical and horizontal, either away from the surface or toward the surface. Accordingly, as used in the term "horizontal sampling," the term "horizontal" has no meaning other than outwardly and around the longitudinal axis of the wellbore.

Horizontal sampling can be a function of the number of sensor assemblies that are arranged around the logging tool assembly and the wellbore casing wall. It will vary depending on the tool configuration and the inside diameter of the casing. It is also impacted by the sensor assembly window size and sensor assembly orientation. Both vertical sampling and horizontal sampling are improved by slowing the logging tool down and increasing the number of sensor assemblies.

For example, the counting time associated with each gamma ray radiation sensor assembly attached to the logging tool body can vary depending on the logging speed. As used herein and in the appended claims, the "counting time" associated with a gamma ray radiation sensor assembly means the number of sensing seconds that the sensor assembly uses to create a value. For example, a fast logging speed will cause the sensor assembly to move across a portion of emitting rock in less time than a slower logging speed on the same rock. As a result, the counting time associated with the sensor assembly will be higher with the slower logging speed.

As the counting time associated with a gamma ray radiation sensor assembly attached to the tool body increases, the number of gamma ray emissions collected by the sensor assembly also increases (assuming gamma rays are present at the time). As long as the counting time is the same across the sampling interval (for example, the vertical distance sampling interval or vertical time sampling interval), then the number of gamma ray emissions collected over that interval by the sensor assembly will be relatively equal. However, if the logging speed changes across the sampling interval, then the number of gamma ray emissions collected over that interval by the sensor assembly will change (due to the changing counting time as opposed to changing gamma ray emissions).

For example, the counting time associated with each gamma ray radiation sensor assembly attached to the logging tool body is in the range from about 0.40 seconds per inch to about 60.00 seconds per inch. For example, the counting time associated with each gamma ray radiation sensor assembly attached to the logging tool body is in the range from about 0.50 seconds per inch to about 12.00 seconds per inch. For example, the counting time associated with each gamma ray radiation sensor assembly attached to the logging tool body is in the range from about 1.00 second per inch to about 4.00 seconds per inch. For example, at a logging speed of 165 FPH, the counting time associated with each gamma ray radiation sensor assembly attached to the logging tool body can be about 1.83 seconds per inch.

The logging tool body has a shape that will allow the logging tool and components attached thereto to fit within a wellbore. For example, the logging tool body has a cylindrical cross-section that has a maximum diameter that is less than the internal diameter of the casing. For example, when the logging tool body has a cylindrical cross-section, the outer diameter of the logging tool body can be 3.5 inches. The internal diameter of the casing can be, for example, 4.8 inches.

For example, a sufficient number of gamma ray radiation sensors can be attached to the logging tool body and equally spaced around the central longitudinal axis of the logging tool body to allow gamma ray radiation data to be collected at sufficient points around the circumference of the wellbore and an image log of an entire geologic unit surrounding the wellbore to be prepared. As will be understood by those skilled in the art with the benefit of this disclosure, the gamma ray radiation data at points between the sensors can be determined by interpolation of the data received by the sensor assemblies. For example, the gamma ray radiation sensors can be altered, modified, or focused to increase the S/N ratio allowing for collection of more accurate spatially correct data.

For example, the gamma ray radiation sensors can be attached to the logging tool body and equally spaced around the central longitudinal axis of the logging tool body. For example, at least four gamma ray radiation sensors and corresponding sensor assemblies can be attached to the logging tool body and equally spaced around the central longitudinal axis of the logging tool body. For example, at least six gamma ray radiation sensors and corresponding sensor assemblies can be attached to the logging tool body and equally spaced around the central longitudinal axis of the logging tool body. For example, at least eight gamma ray radiation sensors and corresponding sensor assemblies can be attached to the logging tool body and equally spaced around the central longitudinal axis of the logging tool body. The only limitation on the upper end of the number of gamma ray radiation sensors and corresponding sensor assemblies that can be attached to the logging tool body and equally spaced around the central longitudinal axis of the logging tool body is practicality. Multiple gamma ray radiation sensors attached to the logging tool body and equally spaced around the central longitudinal axis of the logging tool body increase the S/N ratio associated with the logging tool assembly by improving both vertical and horizontal sampling.

For example, the logging tool body can further include an outer sheath. The gamma ray radiation sensors can be positioned within the outer sheath. Positioning the gamma ray radiation sensors within the outer sheath protects the sensors and helps prevent the logging tool assembly from getting stuck in the well. Alternatively, the gamma ray radiation sensors can be attached to the outside surface of the outer sheath or partially encased by the outer sheath.

For example, the logging tool assembly can further comprise a central core positioned along the central longitudinal axis of said logging tool body between the central longitudinal axis of the logging tool body and the sensors. For example, when the logging tool body further comprises an outer sheath, the central core is positioned within the outer sheath. The central core includes a gamma ray shielding material. For example, the gamma ray shielding material can be formed of tungsten (W). For example, the entire central core can be completely formed of the gamma ray shielding material. Alternatively, the central core can include an inner core wrapped with a central sheath formed of a gamma ray shielding material. For example, the inner core can be hollow or can be formed of lead or another energy absorbing material. For example, the central core can include a lead inner core wrapped with a tungsten central sheath. The central core improves the performance of the logging tool assembly, for example, by increasing the signal-to-noise ratio associated with the tool assembly.

For example, the gamma ray radiation sensors can be linearly arranged and spaced around the central longitudinal axis of the logging tool body in at least one row. As used herein and in the appended claims, stating that the gamma ray radiation sensors are "linearly arranged around the central longitudinal axis of the logging tool body" means that the gamma ray radiation sensors are arranged around the central longitudinal axis of the logging tool body in the same longitudinal positions with respect to the central longitudinal axis of the logging tool body. For example, the gamma ray radiation sensors can be linearly arranged and equally spaced around the central longitudinal axis of the logging tool body in at least one row.

For example, the gamma ray radiation sensors can be linearly arranged and equally spaced around the central longitudinal axis of the logging tool body in two rows. For example, when two rows are utilized, the gamma ray radiation sensor assemblies in one of the rows can be vertically aligned to the sensors in the other row. As used herein and in the appended claims, stating that the sensors in one row are "vertically aligned" to the sensors in the other row means that the sensors in one row are in alignment with the sensors in the other row with respect to the central longitudinal axis of the logging tool body. For example, when two rows are utilized, the gamma ray radiation sensor assemblies in one of the rows can be vertically offset from the sensors in the other row. As used herein and in the appended claims, stating that the sensors in one row are "vertically offset" from the sensors in the other row means that the sensors in one row are not in alignment with the sensors in the other row with respect to the central longitudinal axis of the logging tool body.

As another example, the gamma ray radiation sensors can be vertically staggered and spaced around the central longitudinal axis of the logging tool body in at least one row. For example, the gamma ray radiation sensors can be vertically staggered and equally spaced around the central longitudinal axis of the logging tool body in at least one row. For example, the gamma ray radiation sensors can be vertically staggered and equally spaced around the central longitudinal axis of the logging tool body in two rows. As used herein and in the appended claims, the term "vertically staggered" means arranged in alternating longitudinal positions around the central longitudinal axis of the logging tool body with respect to the central longitudinal axis of the logging tool body.

As another example, the gamma ray radiation sensors can be helically arranged and spaced around the central longitudinal axis of the logging tool body in at least one row. As used herein and in the appended claims, "helically arranged" means arranged in a helix pattern. A helix pattern means a pattern forming a three-dimensional curve around the central longitudinal axis of the logging tool body, whereby the curve's angle to a plane perpendicular to the central longitudinal axis is constant. As another example, the gamma ray radiation sensors can be helically arranged and equally spaced around the central longitudinal axis of the logging tool body in at least one row. For example, the gamma ray radiation sensors can be helically arranged and equally spaced around the central longitudinal axis of the logging tool body in two rows.

For example, the logging tool assembly can include at least two sets of gamma ray radiation sensors, wherein the gamma ray radiation sensors in each set are attached to the logging tool body and equally spaced around the central longitudinal axis of the logging tool body, and wherein the sets are spaced from each other along the central longitudinal axis of the logging tool body. For example, the logging tool assembly can include a first set and a second set of gamma ray radiation sensors, wherein the gamma ray radiation sensors can be helically arranged and equally spaced around the central longitudinal axis of the logging tool body in at least two rows in each set. For example, the gamma ray radiation sensors can be helically arranged to form a two-row right-handed helical arrangement around the central longitudinal axis of the logging tool body in each set. For example, the gamma ray radiation sensors in the first set can be helically arranged to form a right-handed helical arrangement around the central longitudinal axis of the logging tool body, and the gamma ray radiation sensors in the second set can be helically arranged to form a left-handed helical arrangement around the central longitudinal axis of the logging tool body.

For example, when the gamma ray radiation sensors are part of sensor assemblies and the sensor assemblies are linearly arranged and equally spaced around the central longitudinal axis of the logging tool body in at least two rows, the sensor assemblies in each of the rows can be arranged such that the ends of the photomultiplier tubes to which said sensors are attached in one row face the ends of said photomultiplier tubes to which said sensors are attached in the other row. Such an arrangement can be used even when both the scintillation crystal and the photomultiplier tube are contained by the housing.

For example, the well image logging tool assembly can be moved through at least a portion of the wellbore (or all of the wellbore) in accordance with the disclosed method by lowering or otherwise moving the tool assembly to the bottom of the well, or another point in the wellbore, and then pulling the tool assembly toward the surface of the well. For example, the gamma ray radiation data can be collected from geologic unit(s) surrounding or adjacent to the wellbore as the tool assembly is pulled to the surface of the wellbore. For example, a wireline cable can be attached to the top of the image logging tool assembly and used to lower the tool assembly into the cased well and pull the image logging tool assembly toward the surface of the well at a pre-determined logging speed. As another example, the image logging tool assembly can be attached to a coiled tubing unit and moved through all or a portion of the cased hole. For example, in horizontal and other angled wellbores, the logging tool assembly can be attached to a downhole tractor assembly which can help move the image logging tool assembly through the wellbore and get it to the total depth of the wellbore. As will be understood by those skilled in the art with the benefit of this disclosure, other methods can also be used to move the image logging tool assembly through the wellbore as well and get the tool to the total depth of the wellbore.

A well image log based on the collected gamma ray radiation data can be prepared by standard methods known to those skilled in the art with the benefit of this disclosure. The gamma ray radiation data can be recorded, for example, as a function of the logging tool assembly's depth and position in the wellbore to create a gamma ray image log showing different properties of the geologic units.

For example, the method disclosed herein can further comprise creating a three dimensional image of one or more geological units penetrated by the wellbore based on the sampled gamma ray radiation data. The three dimensional image can be interpreted, for example, to determine the dip orientation and bedding azimuth in the geologic unit and/or the nature of the materials in the unit.

For example, an event plane (such as a bed boundary, fracture or fault) crossing the borehole at an angle would generate events at each sensor assembly, and data reflecting these events can be collected at slightly different depths in the wellbore. The relative offset, and the radial and azimuthal positions of each sensor assembly can then be used to compute dip relative to the logging tool body position. Increasing the measurement points provides the advantage of systematic redundancy, which allows the application of statistical error minimization techniques and higher S/N ratios.

For example, the cased well can be inactive or permanently abandoned. As used herein and in the appended claims, an inactive well means a well in which production, injection, disposal or workover operations have ceased, but which has not been permanently abandoned. As used herein, an inactive well includes a well that has been shut in or temporarily abandoned. For example, an inactive well can be a shut-in or temporarily abandoned well. A permanently abandoned well means a well from which no production, injection, disposal or workover operations are expected to be carried out in the future. For example, a permanently abandoned well can be a plugged well. For example, the cased well can be an inactive or permanently abandoned well for which a well image log is not available.

Referring now to FIGS. 1-15 of the drawings, various embodiments of the passive cased well image logging tool assembly for use in a cased well disclosed and used in the method disclosed herein, generally designated by the reference numeral 10, will be described. The passive cased well image logging tool assembly 10 comprises an elongated logging tool body 12 having a central longitudinal axis 14, a plurality of gamma ray radiation sensors 16 attached to the logging tool body and equally spaced around the central longitudinal axis of the logging tool body, and at least one spatial positioning device 18 attached to the logging tool body.

Each sensor 16 is capable of continuously collecting gamma ray radiation data from one or more geologic units surrounding or adjacent to a wellbore as the logging tool assembly is moved through the wellbore. For example, each of the sensors 16 can be a scintillation crystal.

For example, each of the sensors 16 can be part of a sensor assembly 23 that includes a housing 24 and a photomultiplier tube 26 associated with the sensor, wherein the sensor is contained by the housing. For example, both the sensor 16 and the photomultiplier tube 26 can be contained by the housing 24. For example, the housing 24 can be an elongated tube that includes a central longitudinal axis 28. For example, the photomultiplier tube 26 can include a central longitudinal axis 30, a first end 32, and a second end 34, wherein the sensor 16 is attached to one end of the photomultiplier tube. The sensor assemblies 23 can be attached to the logging tool body 12 in a fixed, non-movable manner.

The housing 24 includes a window 36 therein that is positioned over the sensor 16 in the housing in order to allow gamma rays to effectively travel through the housing to reach the sensor. For example, the housing 24 is attached to and extends along the central longitudinal axis 14 of the logging tool body 12. For example, the central longitudinal axis 28 of the housing 24 is parallel to the central longitudinal axis 14 of the logging tool body 12.

As best shown by FIG. 1C, the sensor is contained in a scintillator sub-housing 37. As shown, the scintillator sub-housing 37 is an elongated tube that includes a central longitudinal axis 38. For example, as shown by FIG. 1C, the central longitudinal axis 38 of the scintillator sub-housing 37 is parallel to the central longitudinal axis 14 of the logging tool body 12. For example, when the sensor 16 is a gamma ray scintillation crystal, the sensor 16 fills the whole volume of the scintillator sub-housing 37. For example, when a gamma ray enters the scintillator sub-housing 37, it bounces around throughout the crystal causing the crystal to flash multiple times.

As shown, the photomultiplier tube 26 also extends along the central longitudinal axis 14 of the logging tool body 12. For example, the central longitudinal axis of 30 of the photomultiplier tube 26 is parallel to the central longitudinal axis 14 of the logging tool body 12 and the central longitudinal axis 28 of the housing 24. For example, the sensor 16 is attached to the first end 32 of the photomultiplier tube 26. A plurality of pins 39 are attached to the second end 34 of the photomultiplier tube 30.

The spatial positioning device 18 is capable of continuously collecting sensor position data reflecting the xyz spatial position of the sensors 16 in the wellbore relative to the Earth as the logging tool assembly 10 is moved through the wellbore.

As shown by the drawings, the logging tool body 12 further includes an outer sheath 40 that includes an outside surface 41a and an inside surface 41b. The sensor assemblies 23 are positioned within the outer sheath 40. Positioning the sensor assemblies 23 within the outer sheath 40 protects the sensor assemblies and helps prevent the logging tool assembly 10 from getting stuck in the well. The outer sheath can be used to support the sensor assemblies 23. For example, the sensor assemblies 23 can be attached to the inside surface 41b of the outer sheath 40. Alternatively, for example, the sensor assemblies 23 can be attached to the outside surface 41a of the outer sheath 40 or partially encased by the outer sheath 40. For example, the outer sheath 40 can be formed of metal, plastic or a composite material. For example, the outer sheath 40 can be formed of aluminum.

For example, the logging tool assembly 10 can further comprise a central core 42 positioned within the outer sheath 40 along the central longitudinal axis 14 of the logging tool body 12 between the central longitudinal axis and the sensor assemblies 23. The central core 42 includes a gamma ray shielding material. For example, the gamma ray shielding material can be formed of tungsten (W). For example, the entire central core 42 can be completely formed of the gamma ray shielding material, for example tungsten. Alternatively, the central core 42 can include an inner core 43 wrapped with a central sheath 44 formed of a gamma ray shielding material. For example, the inner core 43 can be hollow or can be formed of lead, a mixture of lead and tungsten, or another energy absorbing material. For example, the central sheath 44 can have a thickness of about one inch. For example, the central core 42 can include a lead inner core 43 wrapped with a tungsten central sheath 44. The central core 42 improves the performance of the logging tool assembly 10, for example, by increasing the signal-to-noise ratio associated with the tool assembly.

A signal processing unit 46 is also attached to the logging tool body 12. As discussed above, alternatively, the signal processing unit can be positioned on the surface or at some other location. An omnidirectional gamma ray device 48 is also attached to the logging tool body. The omnidirectional gamma ray device 48 functions to provide a base line for offset normalization of gamma rays.

An attachment assembly 54 for allowing the logging tool assembly 10 to be attached to the end of a cable wireline, coiled tubing, or tractor assembly for example, is positioned at the top 56 of the logging tool body 12. For example, as known to those skilled in the art, the attachment assembly 54 can have a structure that allows the end of a wireline cable to be attached thereto.

Although not shown by the drawings, the logging tool assembly 10 also includes a number of other components including one or more circuits and systems (not shown) necessary to allow the sensor assemblies to communicate with the signal processing unit (for example, to allow the sensor assemblies to transmit the data they collect and their position relative to the tool body to the signal processing unit), and to otherwise operate the tool as desired. For example, a standard centralizer can be used to center the tool assembly 10 in the borehole.

For example, the arrangement in which the sensor assemblies 23 are attached to the logging tool body 12 and the number of sensor assemblies that are used can vary. Most of the embodiments shown by the drawings include six sensor assemblies 23 in each row. However, the number of sensor assemblies 23 in each row can be decreased or increased. For example, each row can include four sensor assemblies 23.

Referring now specifically to FIGS. 1A and 1B, one embodiment of the passive cased well image logging tool assembly 10 will be described. In this embodiment, six sensor assemblies 23 and corresponding sensors 16 are linearly arranged and equally spaced around the central longitudinal axis 14 of the logging tool body 12 in a plane 58 perpendicularly extending from the central longitudinal axis of the logging tool body and in a row 59. The sensor assemblies 23 are directly attached to the logging tool body 12.

Referring now specifically to FIG. 2A, another embodiment of the passive cased well image logging tool assembly 10 will be described. In this embodiment, six sensor assemblies 23 and corresponding sensors 16 are linearly arranged and equally spaced around the central longitudinal axis 14 of the logging tool body 12 in a plane 60a perpendicularly extending from the central longitudinal axis of the logging tool body and in a first row 62. In addition, six sensor assemblies 23 and corresponding sensors 16 are linearly arranged and equally spaced around the central longitudinal axis 14 of the logging tool body 12 in a plane 60b perpendicularly extending from the central longitudinal axis of the logging tool body and in a second row 64. The sensor assemblies 23 are directly attached to the logging tool body 12. The sensor assemblies 23 and corresponding sensors 16 in the first row 62 are vertically aligned to the sensor assemblies 23 and corresponding sensors 16 in the second row 64.

As shown by FIG. 2A, the sensor assemblies 23 in each of the rows 62 and 64 are arranged such that the first ends 32 of the photomultiplier tubes 26 (the ends of the photomultiplier tubes 26 to which the scintillator sub-housings 37 and sensors 16 are attached) in the first row 62 face the first ends 32 of the photomultiplier tubes 26 (the ends of the photomultiplier tubes 26 to which the scintillator sub-housings 37 and sensors 16 are attached) in the row second 64. As used herein and in the appended claims, the first ends of the photomultiplier tubes in a first row "face" the first ends of the photomultiplier tubes in a second row regardless of whether the sensors in the first row and the sensors in the second row are vertically aligned to one another or vertically offset from one another.

Figure 2B:
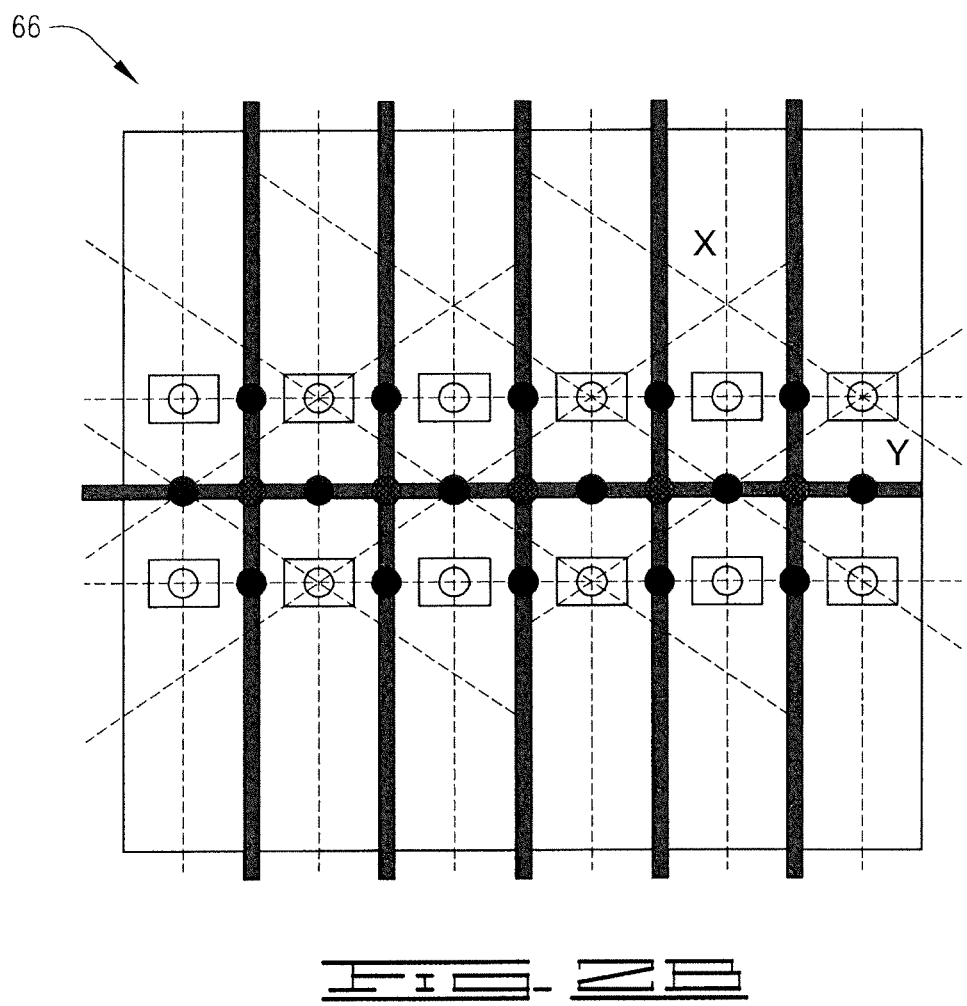
FIG. 2B is a plan view in the form of a diagram illustrating sensor assembly data recorded points and calculated points from eight of the twelve sensor assemblies associated with the logging tool shown by FIG. 2A.

FIG. 2B is a plan view in the form of a diagram 66 corresponding to the arrangement of the sensor assemblies 23 and sensors 16 shown in FIG. 2A. The diagram 66 shows the gamma ray measurement area 68 associated with the sensors 16 and the recorded points 70 (the actual measurement points), that is points that correspond to the locations of the sensors on the logging tool body 12 (the locations where gamma ray data is actually sensed). The diagram 66 also includes lines of calculation 72 which are the lines on which gamma ray data can be calculated by interpolating the recorded points 70. For example, the diagram 66 also shows calculated points 73 on lines of calculation 72, that is points at which gamma ray data has been calculated based on interpolation of the recorded points 70. For example, the diagram 66 also shows shared calculated points 74 on lines of calculation 72, that is points at which gamma ray data has been calculated based on interpolation of at least two sets of calculated points 73.

Figure 3A:
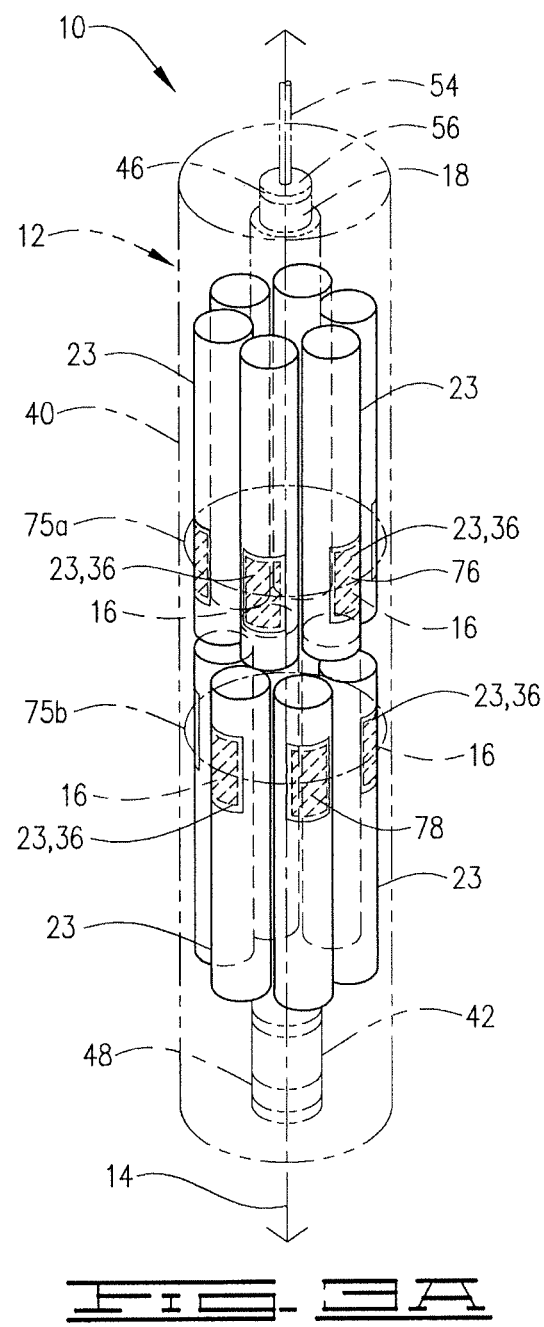
FIG. 3A is a perspective view of another embodiment of the passive cased well image logging tool assembly disclosed herein.

Referring now to FIG. 3A, another embodiment of the passive cased well image logging tool assembly 10 will be described. This embodiment is the same as the embodiment shown by FIG. 2A, except in this embodiment the sensor assemblies 23 and corresponding sensors 16 in one row are not vertically aligned to the sensor assemblies and corresponding sensors in the other row. Rather, as shown by FIG. 3A, the sensor assemblies 23 and corresponding sensors 16 in one row are vertically offset from the sensor assemblies and corresponding sensors in the other row. For example, the sensor assemblies 23 and corresponding sensors 16 in one row can be vertically and equidistantly offset from the sensor assemblies and corresponding sensors in the other row. Specifically, six sensor assemblies 23 and corresponding sensors 16 are linearly arranged and equally spaced around the central longitudinal axis 14 of the logging tool body 12 in a plane 75*a* perpendicularly extending from the central longitudinal axis of the logging tool body and in a first row 76. Also, six sensor assemblies 23 are linearly arranged and equally spaced around the central longitudinal axis 14 of the logging tool body 12 in a plane 75*b* perpendicularly extending from the central longitudinal axis of the logging tool body and in a second row 78. The sensor assemblies 23 and corresponding sensors 16 in the first row 76 are vertically offset from the sensor assemblies and corresponding sensors in the second row 78.

As shown by FIG. 3A, the sensor assemblies 23 in each of the rows 76 and 78 are arranged such that the first ends 32 of the photomultiplier tubes 26 (the ends of the photomultiplier tubes 26 to which the scintillator sub-housings 37 and sensors 16 are attached) in the first row 76 face the first ends 32 of the photomultiplier tubes 26 (the ends of the photomultiplier tubes 26 to which the scintillator sub-housings 37 and sensors 16 are attached) in the row second 78. When two rows of gamma ray radiation sensor assemblies 23 and corresponding sensors 16 are equally spaced around the logging tool body 12, and the sensors in one row are equidistantly offset from the sensors in the other row along the longitudinal axis 14 of the logging tool body, maximum coverage of the inside of the casing can be achieved.

Figure 3B:
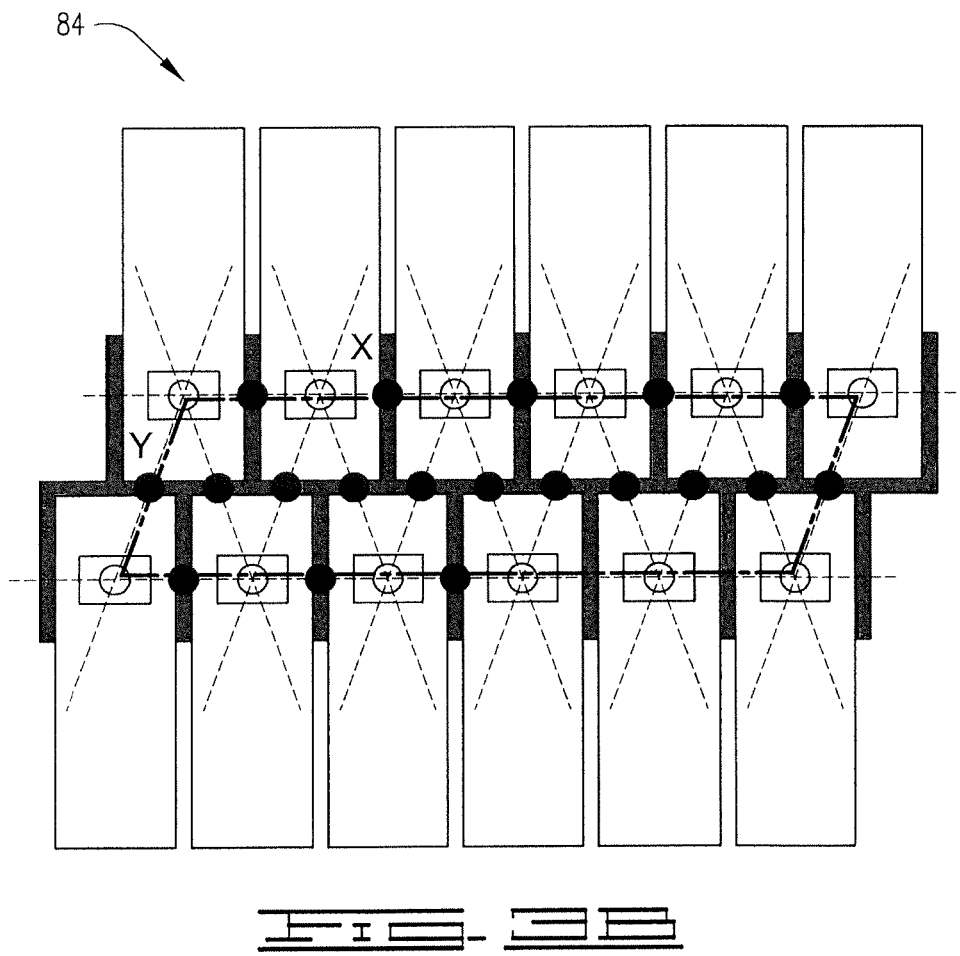
FIG. 3B is a plan view in the form of a diagram illustrating sensor assembly data recorded points and calculated points from eight of the twelve sensor assemblies associated with the logging tool shown by FIG. 3A.

FIG. 3B is a plan view in the form of a diagram 84 corresponding to the arrangement of the sensor assemblies 23 and corresponding sensors 16 shown in FIG. 3A. The diagram 84 shows the gamma ray measurement area 86 associated with the sensors 16 and the recorded points 88 (the actual measurement points), that is points that correspond to the locations of the sensors on the logging tool body 12 (the locations where gamma ray data is actually sensed). The diagram 84 also includes lines of calculation 90 which are the lines on which gamma ray data can be calculated by interpolating the recorded points 88. For example, the diagram 84 also shows calculated points 92 on lines of calculation 90, that is points at which gamma ray data has been calculated based on interpolation of the recorded points 88.

Figure 4A:
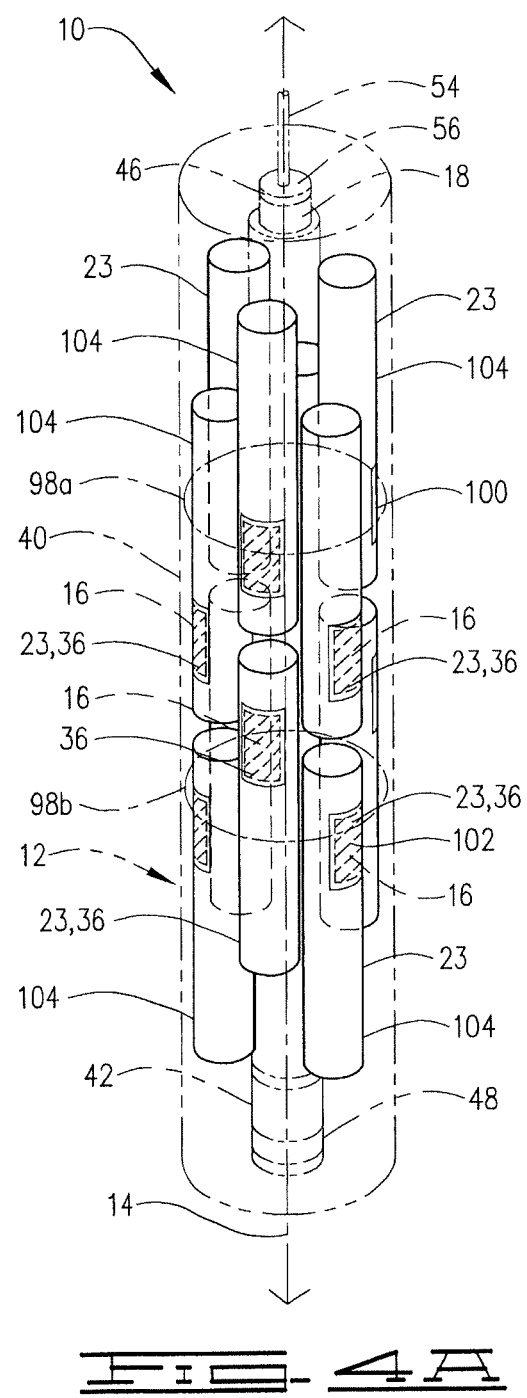
FIG. 4A is a perspective view of another embodiment of the passive cased well image logging tool assembly disclosed herein.

Referring now to FIG. 4A, another embodiment of the passive cased well image logging tool assembly 10 will be described. This embodiment is the same as the embodiment shown by FIG. 2A, except in this embodiment, the sensor assemblies 23 and corresponding sensors 16 in each row are vertically staggered and equally spaced around the central longitudinal axis 14 of the logging tool body 12. Specifically, six sensor assemblies 23 and corresponding sensors 16 are vertically staggered and equally spaced around the central longitudinal axis 14 of the logging tool body 12 in a plane 98*a* perpendicularly extending from the central longitudinal axis of the logging tool body and in a first row 100. Also, six sensor assemblies 23 are vertically staggered and equally spaced around the central longitudinal axis 14 of the logging tool body 12 along a plane 98*b* perpendicularly extending from the central longitudinal axis of the logging tool body and in a second row 102. The sensor assemblies 23 and corresponding sensors 16 can also be vertically staggered and equally spaced around the central longitudinal axis 14 of the logging tool body 12 in a single row.

As shown by FIG. 4A, the sensor assemblies 23 in each of the rows 100 and 102 are arranged such that the first ends 32 of the photomultiplier tubes 26 (the ends of the photomultiplier tubes 26 to which the scintillator sub-housings 37 and sensors 16 are attached) in the first row 100 face the first ends 32 of the photomultiplier tubes 26 (the ends of the photomultiplier tubes 26 to which the scintillator sub-housings 37 and sensors 16 are attached) in the row second 102. The sensor assemblies 23 and corresponding sensors 16 in each row are arranged in alternating longitudinal positions 104 around the logging tool body with respect to the central longitudinal axis 14 of the logging tool body 12. The sensor assemblies 23 and corresponding sensors 16 in the first row 100 are vertically aligned to the sensor assemblies 23 and corresponding sensors 16 in the second row 102.

FIG. 4B is a plan view in the form of a diagram 110 corresponding to the arrangement of the sensor assemblies 23 and sensors 16 shown in FIG. 4A. The diagram 110 shows the gamma ray measurement area 112 associated with the sensors 16 and the recorded points 114 (the actual measurement points), that is points that correspond to the locations of the sensors 16 on the logging tool body 12 (the locations where gamma ray data is actually sensed). The diagram 110 also includes lines of calculation 118 which are the lines on which gamma ray data can be calculated by interpolating the recorded points 114. For example, the diagram 110 also shows calculated points 120 on lines of calculation 118, that is points at which gamma ray data has been calculated based on interpolation of the recorded points 114. For example, the diagram 110 also shows shared calculated points 122 on lines of calculation 118, that is points at which gamma ray data has been calculated based on interpolation of at least two sets of calculated points 120. By interpolating the data in two ways and averaging the results, the shared calculated points 122 are more accurate.

Referring now to FIG. 5A, another embodiment of the passive cased well image logging tool assembly 10 will be described. In this embodiment, six sensor assemblies 23 and corresponding sensors 16 are helically arranged and equally spaced around the central longitudinal axis 14 of the logging tool body 12 in a plane 128 perpendicularly extending from the central longitudinal axis of the logging tool body and in a row 130 to form a single-row right-handed helical arrangement 132 on the logging tool body. The sensor assemblies 23 are directly attached to the logging tool body 12.

FIG. 5B is a plan view in the form of a diagram 134 corresponding to a portion of the arrangement of the sensor assemblies 23 and sensors 16 shown in FIG. 5A. The diagram 134 shows the gamma ray measurement area 136 associated with the corresponding sensors 16 and the recorded points 138 (the actual measurement points), that is points that correspond to the locations of the corresponding sensors on the logging tool body 12 (the locations where gamma ray data is actually sensed). The diagram 134 also includes lines of calculation 140 which are the lines on which gamma ray data can be calculated by interpolating the recorded points 138. For example, the diagram 134 also shows calculated points 142 on lines of calculation 140, that is points at which gamma ray data has been calculated based on interpolation of the recorded points 138.

Referring now specifically to FIG. 6A, another embodiment of the passive cased well image logging tool assembly 10 will be described. In this embodiment, six sensor assemblies 23 and corresponding sensors 16 are helically arranged and equally spaced around the central longitudinal axis 14 of the logging tool body 12 in a plane 150a perpendicularly extending from the central longitudinal axis of the logging tool body and in a first row 152. Six sensor assemblies 23 and corresponding sensors 16 are also helically arranged and equally spaced around the central longitudinal axis 14 of the logging tool body 12 in a plane 150b perpendicularly extending from the central longitudinal axis of the logging tool body and in a second row 153, to form a two-row right-handed helical arrangement 154 on the logging tool body. The sensor assemblies 23 are directly attached to the logging tool body 12. The sensor assemblies 23 and corresponding sensors 16 in the first row 152 are vertically aligned to the sensor assemblies 23 and corresponding sensors 16 in the second row 153.

As shown by FIG. 6A, the sensor assemblies 23 in each of the rows 152 and 153 are arranged such that the first ends 32 of the photomultiplier tubes 26 (the ends of the photomultiplier tubes 26 to which the scintillator sub-housings 37 and sensors 16 are attached) in the first row 152 face the first ends 32 of the photomultiplier tubes 26 (the ends of the photomultiplier tubes 26 to which the scintillator sub-housings 37 and sensors 16 are attached) in the second row 153. The sensor assemblies 23 and sensors 16 in the first row 152 are vertically aligned to the sensor assemblies 23 and sensors 16 in the second row 153.

FIG. 6B is a plan view in the form of a diagram 155 corresponding to a portion of the arrangement of the sensor assemblies 23 and sensors 16 shown in FIG. 6A. The diagram 155 shows the gamma ray measurement area 156 associated with the corresponding sensors 16 and the recorded points 158, that is points that correspond to the locations of the corresponding sensors on the logging tool body 12 (the locations where gamma ray data is actually sensed). The diagram 155 also includes lines of calculation 160 which are the lines on which gamma ray data can be calculated by interpolating the recorded points 158. For example, the diagram 155 also shows calculated points 162 on lines of calculation 160, that is points at which gamma ray data has been calculated based on interpolation of the recorded points 158. For example, the diagram 155 also shows shared calculated points 164 on lines of calculation 160, that is points at which gamma ray data has been calculated based on interpolation of at least two sets of calculated points 162. For example, the diagram 155 also shows extra calculated points 166 on lines of calculation 160, that is points at which gamma ray data has been calculated based on interpolation of other calculated points.

Referring now to FIG. 7A, another embodiment of the passive cased well image logging tool assembly 10 will be described. This embodiment is similar to the embodiment shown by FIG. 6A, except in this embodiment, the logging tool assembly 10 includes two sets of gamma ray radiation sensor assemblies 23 and sensors 16, a first set 170 and a second set 172. As shown by FIG. 7A, in each of the sets 170 and 172, the sensor assemblies 23 and sensors 16 are helically arranged and equally spaced around the central longitudinal axis 14 of the logging tool body 12 in a plane 174a perpendicularly extending from the central longitudinal axis of the logging tool body 12 and in a first row 176, and are helically arranged and equally spaced around the central longitudinal axis of the logging tool body in a plane 174b perpendicularly extending from the central axis of the logging tool body and in a second row 178, to form a two-row right-handed helical arrangement 180 on the logging tool body. The sensor assemblies 23 in each of the sets 170 and 172 are directly attached to the logging tool body 12. The sensor assemblies 23 and sensors 16 in the first row 176 are vertically aligned to the sensor assemblies 23 and corresponding sensors 16 in the second row 178. As oriented in the drawings, the set 170 is on top of the set 172 on the logging tool body 12.

As shown by FIG. 7A, in each of the sets 170 and 172, the sensor assemblies 23 in each of the rows 176 and 178 are arranged such that the first ends 32 of the photomultiplier tubes 26 (the ends of the photomultiplier tubes 26 to which the scintillator sub-housings 37 and sensors 16 are attached) in the first row 176 face the first ends 32 of the photomultiplier tubes 26 (the ends of the photomultiplier tubes 26 to which the scintillator sub-housings 37 and sensors 16 are attached) in the second row 178. The sensor assemblies 23 and sensors 16 in the first row 176 are vertically aligned to the sensor assemblies 23 and sensors 16 in the second row 178.

Figure 7B:
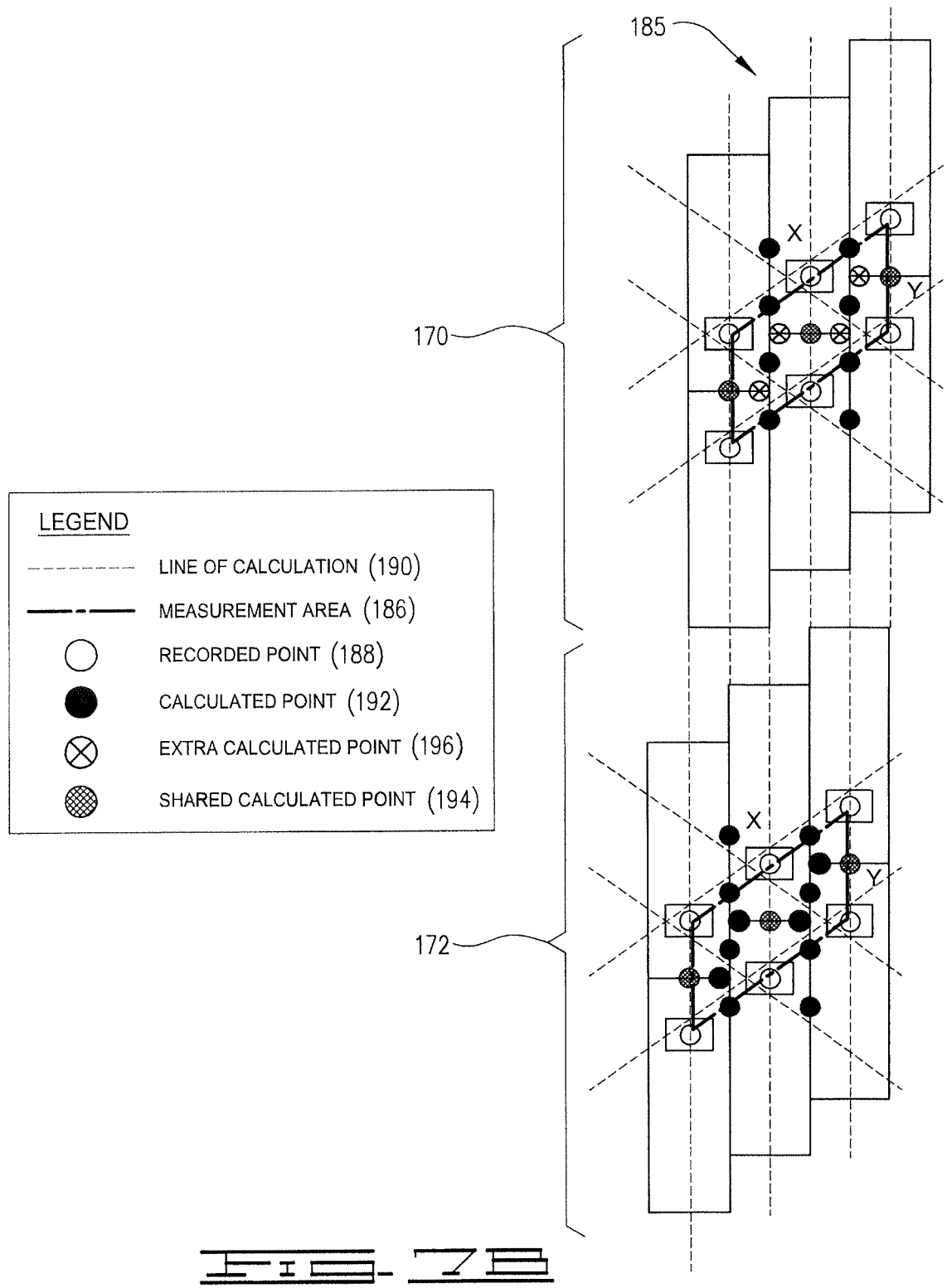
FIG. 7B is a plan view in the form of a diagram illustrating sensor assembly data recorded points and calculated points from twelve of the twenty four sensor assemblies associated with the logging tool shown by FIG. 7A.

FIG. 7B is a plan view in the form of a diagram 185 corresponding to a portion of the arrangement of the sensor assemblies 23 and sensors 16 in each of the sets 170 and 172 shown in FIG. 7A. The diagram 185 shows the gamma ray measurement area 186 associated with the corresponding sensors 16 and the recorded points 188, that is points that correspond to the locations of the corresponding sensors on the logging tool body 12 (the locations where gamma ray data is actually sensed). The diagram 185 also includes lines of calculation 190 which are the lines on which gamma ray data can be calculated by interpolating the recorded points 188. For example, the diagram 185 also shows calculated points 192 on lines of calculation 190, that is points at which gamma ray data has been calculated based on interpolation of the recorded points 188. For example, the diagram 185 also shows shared calculated points 194 on lines of calculation 190, that is points at which gamma ray data has been calculated based on interpolation of at least two sets of calculated points 192. For example, the diagram 185 also shows extra calculated points 196 on lines of calculation 190, that is points at which gamma ray data has been calculated based on interpolation of other calculated points.

Figure 8A:
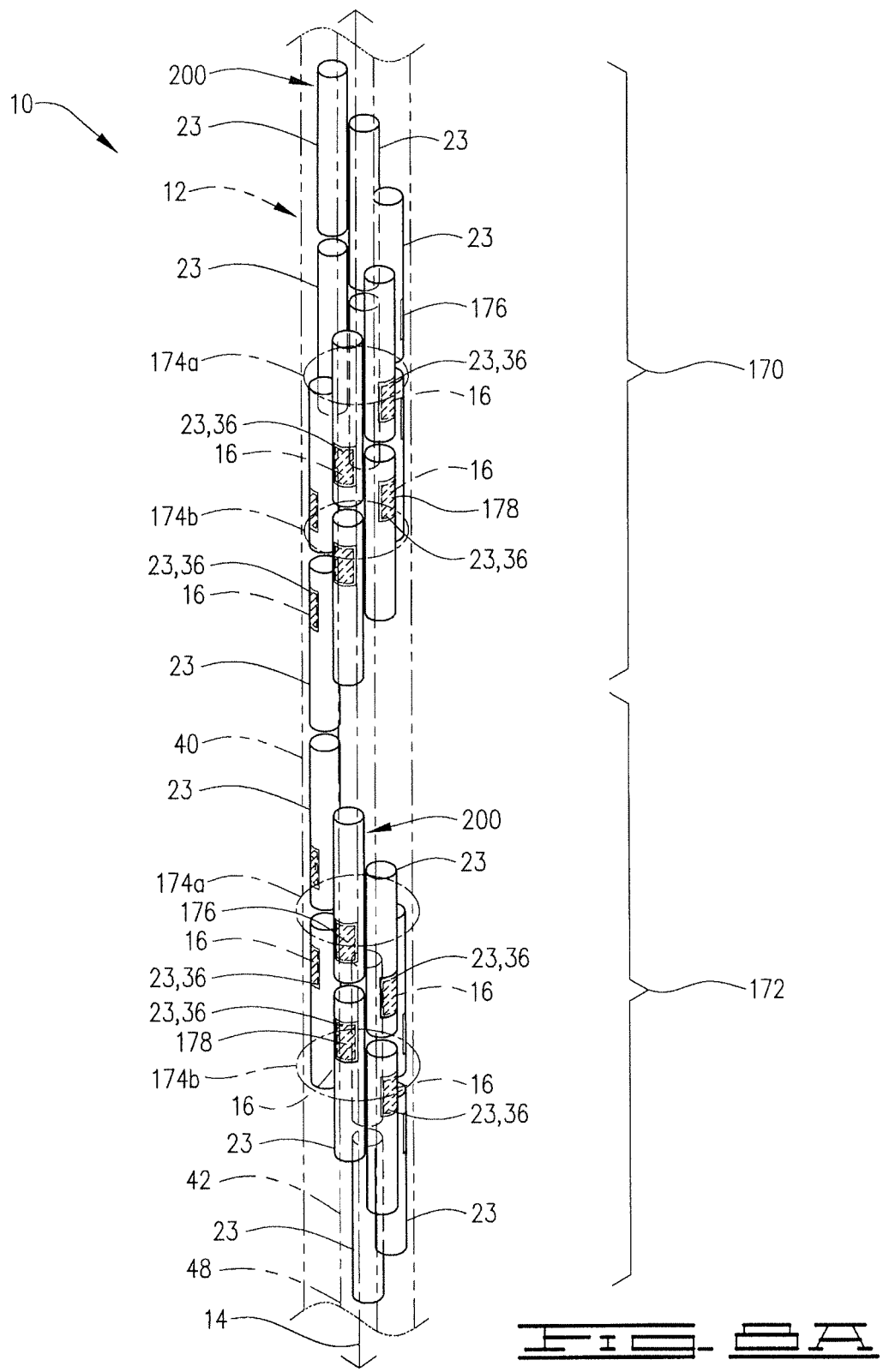
FIG. 8A is a perspective view of another embodiment of the passive cased well image logging tool assembly disclosed herein.

Referring now to FIG. 8A, another embodiment of the passive cased well image logging tool assembly 10 will be described. This embodiment is the same in all respects to the embodiment shown by FIG. 7A, except in this embodiment, the sensor assemblies 23 and corresponding sensors 16 in the second set 172 are helically arranged to form a two-row left-handed helical arrangement 200 around the central longitudinal axis 14 of the logging tool body 12. Thus, the sensor assemblies 23 and sensors 16 are helically arranged to form a two-row right-handed helical arrangement 180 in the first set 170, and are arranged to form a two-row left-handed helical arrangement 200 in the second set 172. As oriented in the drawings, the set 170 is on top of the set 172 on the logging tool body 12.

Figure 8B:
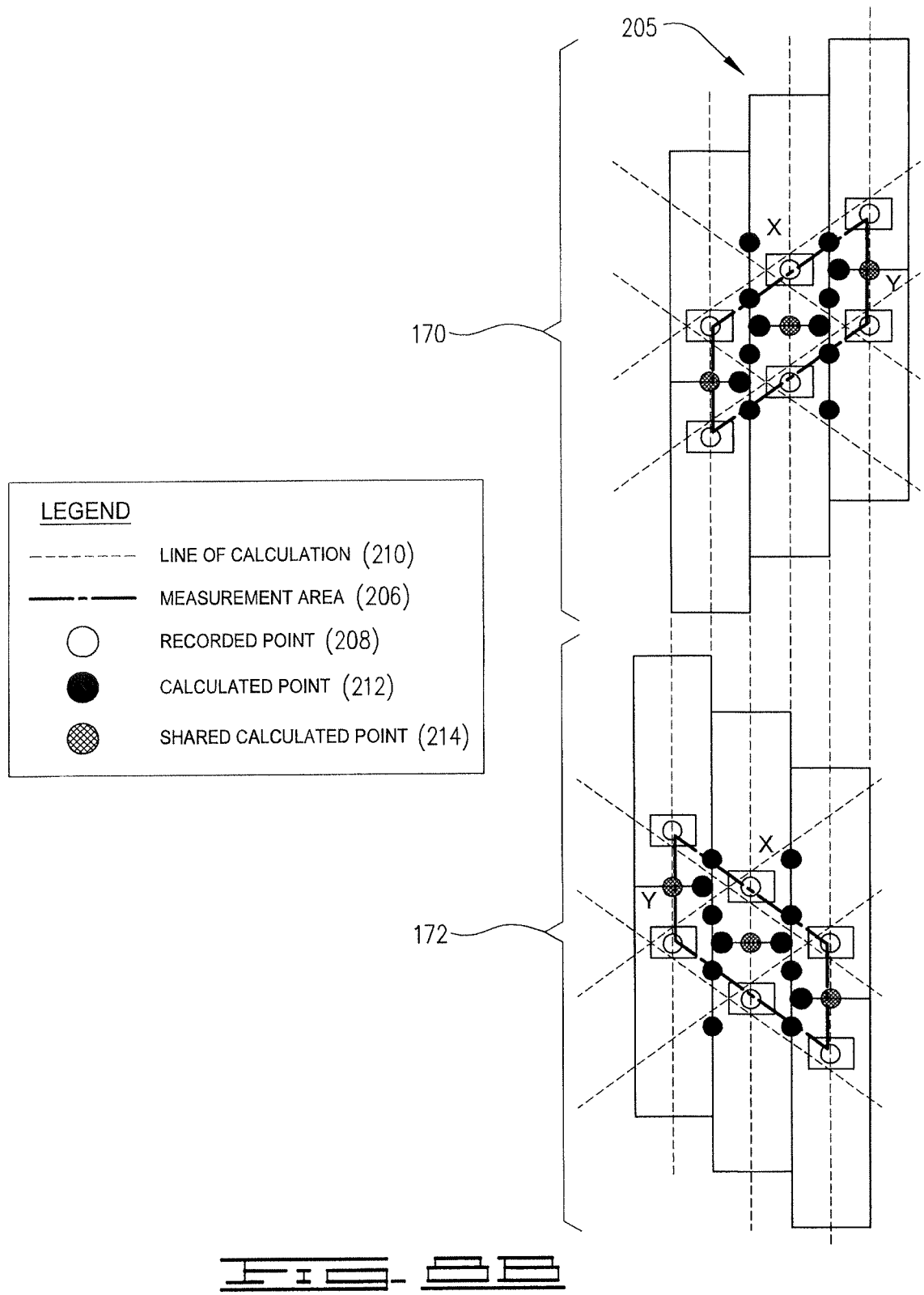
FIG. 8B is a plan view in the form of a diagram illustrating sensor assembly data recorded points and calculated points from twelve of the twenty four sensor assemblies associated with the logging tool shown by FIG. 8A.

FIG. 8B is a plan view in the form of a diagram 205 corresponding to a portion of the arrangement of the sensor assemblies 23 and sensors 16 shown in each of the sets 170 and 172 in FIG. 8A. The diagram 205 shows the gamma ray measurement area 206 associated with the corresponding sensors 16 and the recorded points 208, that is points that correspond to the locations of the corresponding sensors on the logging tool body 12 (the locations where gamma ray data is actually sensed). The diagram 205 also includes lines of calculation 210 which are the lines on which gamma ray data can be calculated by interpolating the recorded points 208. For example, the diagram 205 also shows calculated points 212 on lines of calculation 210, that is points at which gamma ray data has been calculated based on interpolation of the recorded points 208. For example, the diagram 205 also shows shared calculated points 214 on lines of calculation 210, that is points at which gamma ray data has been calculated based on interpolation of at least two sets of calculated points 212.

Referring now to FIGS. 9A and 9B, another embodiment of the passive cased well image logging tool assembly 10 will be described. This embodiment is similar to the embodiment shown by FIG. 6A, except in this embodiment, there are only four sensor assemblies 23 and corresponding sensors 16 in each row. Specifically, four sensor assemblies 23 and corresponding sensors 16 are helically arranged and equally spaced around the central longitudinal axis 14 of the logging tool body 12 in a plane 220a perpendicularly extending from the central longitudinal axis of the logging tool body and in a first row 222a. Also, four sensor assemblies 23 and corresponding sensors 16 are helically arranged and equally spaced around the central longitudinal axis 14 of the logging tool body 12 in a plane 220b perpendicularly extending from the central axis of the logging tool body and in a second row 222b, to form a two-row right-handed helical arrangement 223 on the logging tool body. The sensor assemblies 23 are directly attached to the logging tool body 12. The sensor assemblies 23 and corresponding sensors 16 in the first row 222a are vertically aligned to the sensor assemblies 23 and corresponding sensors 16 in the second row 222b.

As shown by FIG. 9A, the sensor assemblies 23 in each of the rows 222a and 222b are arranged such that the first ends 32 of the photomultiplier tubes 26 (the ends of the photomultiplier tubes 26 to which the scintillator sub-housings 37 and sensors 16 are attached) in the first row 222a face the first ends 32 of the photomultiplier tubes 26 (the ends of the photomultiplier tubes 26 to which the scintillator sub-housings 37 and sensors 16 are attached) in the second row 222b. The sensor assemblies 23 and sensors 16 in the first row 222a are vertically aligned to the sensor assemblies 23 and sensors 16 in the second row 222b.

FIG. 10 illustrates the flow of wellbore fluid (for example, kill fluid) around and through the logging tool assembly when a helical arrangement of sensor assemblies and sensors is utilized in association with the logging tool assembly disclosed herein. For example, at any point, only one sensor assembly 23 will be blocking 100% of the flow. Two sensor assemblies 23 will be blocking 50% of the flow, and four sensor assemblies will be blocking 25% of the flow. Thus, there is always a gap for wellbore fluid to flow through, which, for example, allows the logging tool assembly to be more easily moved through the wellbore.

As shown by FIGS. 1-10, the housings 24 of the sensor assemblies 23 contain the sensors 16 and photomultiplier tubes 26. For example, as shown, each housing 24 is a cylindrical tube having a diameter of less than an inch and a length of about six inches. The central longitudinal axis 28 of the housing 24, as well as the central longitudinal axis 38 of the scintillator sub-housing 37 and the central longitudinal axis 30 of the photomultiplier tube 26, extend along and are parallel to the central longitudinal axis 14 of the logging tool body 12. When two rows of sensor assemblies 23 are used, the sensor assemblies and corresponding sensors 16 face each other (either in alignment with each other or offset from one another).

However, as shown by FIGS. 11A-11C and FIGS. 12A-12C, the size and shape of the sensor assemblies as well as the manner in which the sensor assemblies 23 are oriented with respect to the logging tool body 12 can vary. For example, the embodiment of the logging tool assembly 10 shown by FIGS. 11A-11C is similar to the embodiment of the logging tool assembly shown by FIG. 5A, except for the size, shape and orientation of the sensor assemblies 23. In the embodiment shown by FIGS. 11A-11C, the central longitudinal axis 30 of the photomultiplier tube 26 of each sensor assembly 23 extends parallel to the central longitudinal axis 14 of the logging tool body 12. However, the central longitudinal axis 38 of the corresponding scintillator sub-housing 37 of each sensor assembly 23 extends perpendicularly outwardly from the central longitudinal axis 30 of the corresponding photomultiplier tube 26 and the central longitudinal axis 14 of the logging tool body 12. Such an "L" configuration of the sensor assemblies 23 can alter the final assembly orientation in the logging tool body 12, and can allow the size of the sensors 16 to be increased.

Figure 12A:
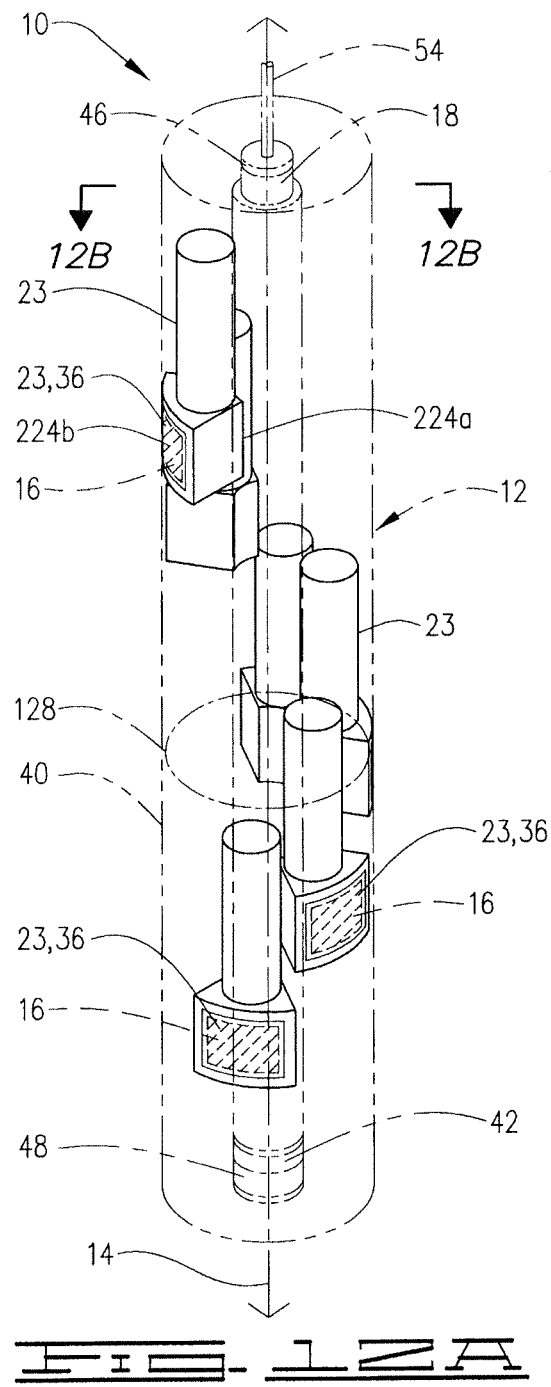
FIG. 12A is a side view illustrating another alternative embodiment of the sensor assemblies with respect to the logging tool body of the logging tool assembly disclosed herein.
Figure 12B:
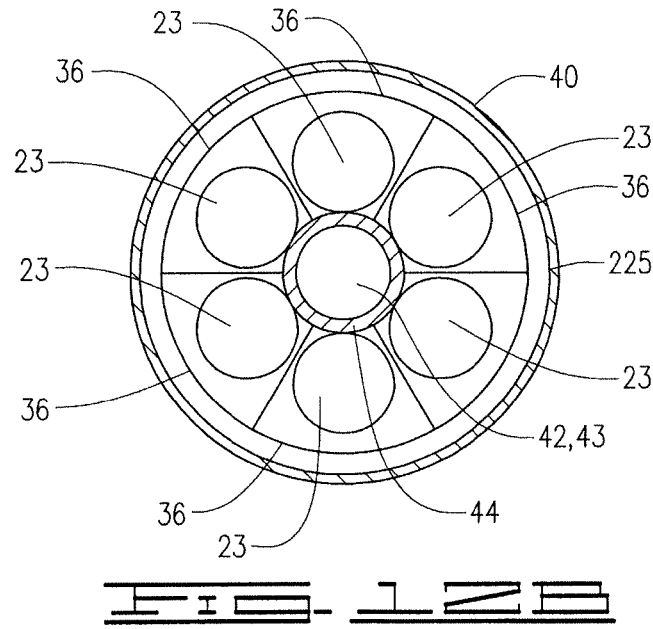
FIG. 12B is a cross-sectional view taken along the lines 12B-12B of FIG. 12A.
Figure 12C:
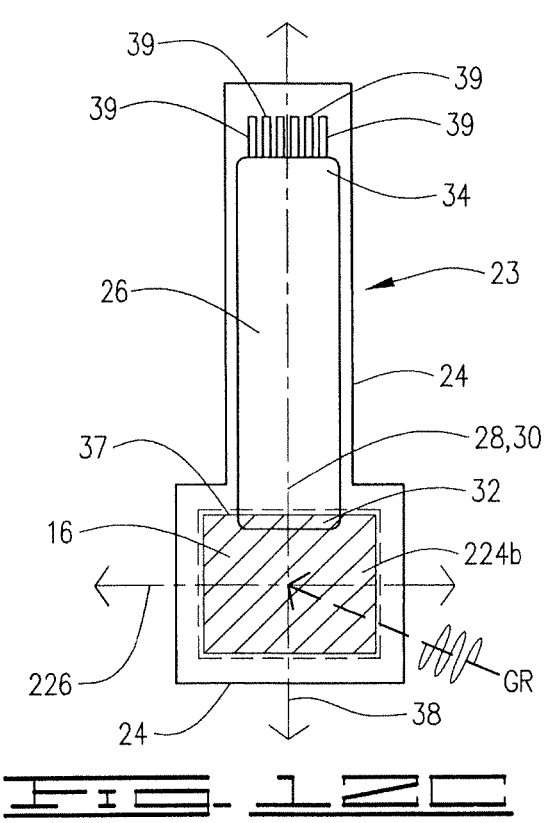
FIG. 12C is an enlarged sectional view of one of the sensor assemblies illustrated by FIG. 12A.

For example, the embodiment of the logging tool assembly 10 shown by FIG. 12A-12C is similar to the embodiment of the logging tool assembly shown by FIG. 5A, except for the size, shape and orientation of the scintillator sub-housings 37 and corresponding sensors 16. In the embodiment shown by FIGS. 12A-12C, the central longitudinal axis 30 of the photomultiplier tube 26 of each sensor assembly 23 extends parallel to the central longitudinal axis 14 of the logging tool body 12. The central longitudinal axis 38 of the scintillator sub-housing 37 of each sensor subassembly extends parallel to both the central longitudinal axis 30 of the corresponding photomultiplier tube 26 and the central longitudinal axis 14 of the logging tool body. However, the size and shape of the scintillator sub-housing 37 of each sensor assembly 23 of the embodiment shown by FIGS. 12A-12C is different. For example, as shown, each scintillator sub-housing 37 is larger and has a wedge shape. Specifically, the scintillator sub-housing 37 of each sensor assembly 23 of the embodiment shown by FIGS. 12A-12C includes a base 224a facing the central core 42 of the logging tool assembly 10 and a face 224a facing the inside surface 41b of the outer sheath 40 of the logging tool assembly. The central horizontal axis 226 of each scintillator sub-housing 37 extends perpendicularly outwardly from the central longitudinal axis 38 of the scintillator sub-housing, the central longitudinal axis 30 of the corresponding photomultiplier tube 26 and the central longitudinal axis 14 of the logging tool body. Such a wedge shape can alter the final assembly orientation in the logging tool body 12, and can allow the size of the sensors 16 to be increased. For example, scintillation crystals can fill the entire volume of the scintillator sub-housing 37.

For example, when six sensors 16 are utilized, the coverage of each sensor is typically 60° per sensor making the collective coverage of the sensors the 360° perimeter around the logging tool assembly 10. On the other hand, for example, in a helical arrangement, larger sensors can be used (as shown by FIGS. 11A-11C and 12A-12C) allowing the focus of each sensor to overlap which makes the collective coverage around the perimeter of the logging tool assembly 10 greater than 360°.

The size and shape of the sensor assemblies 23 and individual components thereof as well as the manner in which the sensor assemblies 23 and individual components thereof are oriented can vary within a single arrangement of sensor assemblies around the central longitudinal axis 14 of the logging tool body. For example, in a two row helical arrangement, one or more sensor assemblies of the type shown by FIG. 5A can be combined with one or more of the sensor assemblies of the types shown by FIG. 11A and FIG. 12A.

Figure 13:
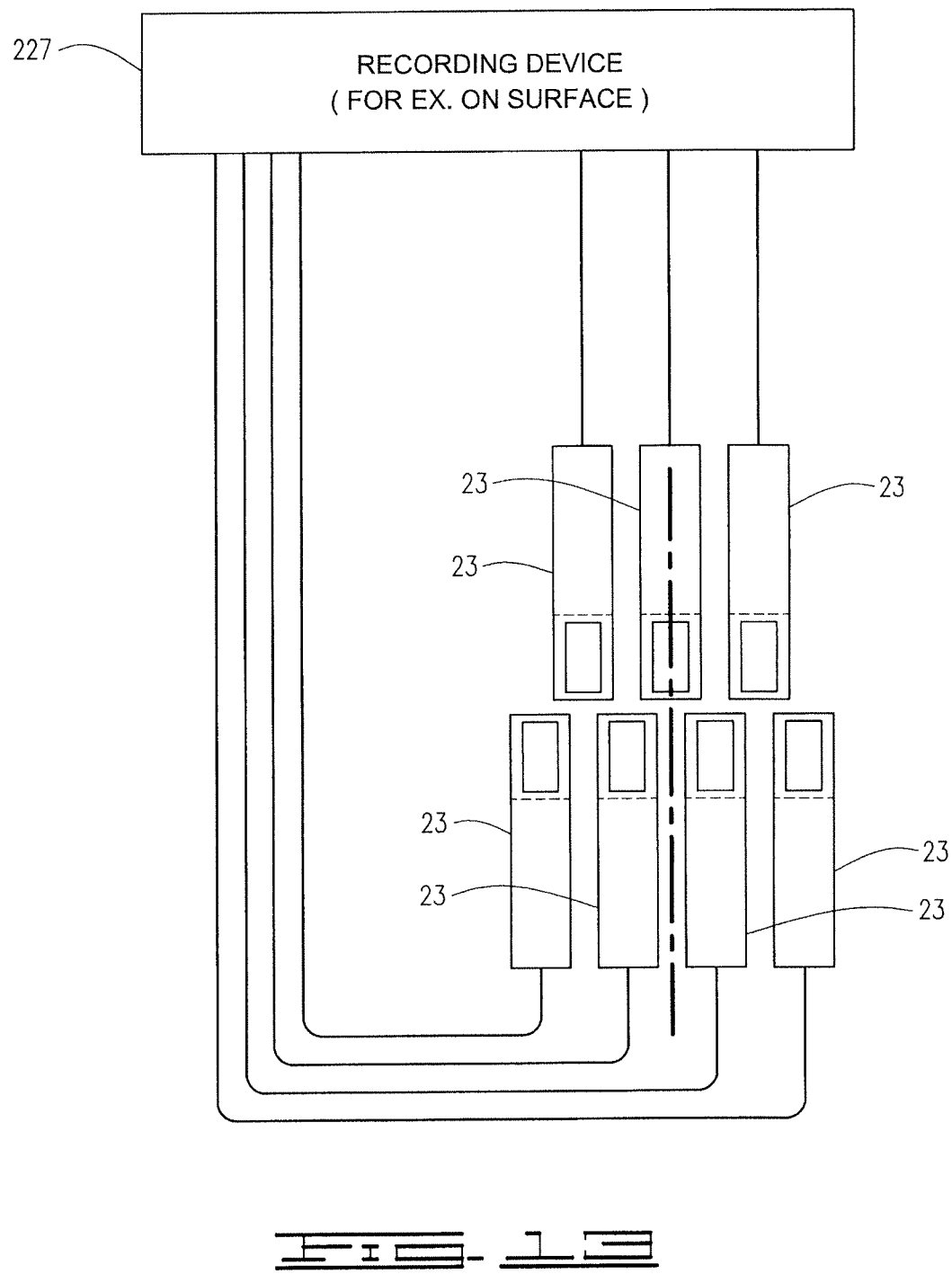
FIG. 13 is a schematic view illustrating the transmission of gamma ray radiation data from sensor assemblies of the logging tool assembly disclosed herein to a recording device remote from the sensor assemblies.

FIG. 13 schematically illustrates the transmission of gamma ray radiation data from sensor assemblies 23 of the logging tool assembly 10 to a recording device 227 remote from the sensor assemblies. For example, the recording device can be part of the logging tool assembly 12 or can be located on the surface associated with the well.

Figure 14A:
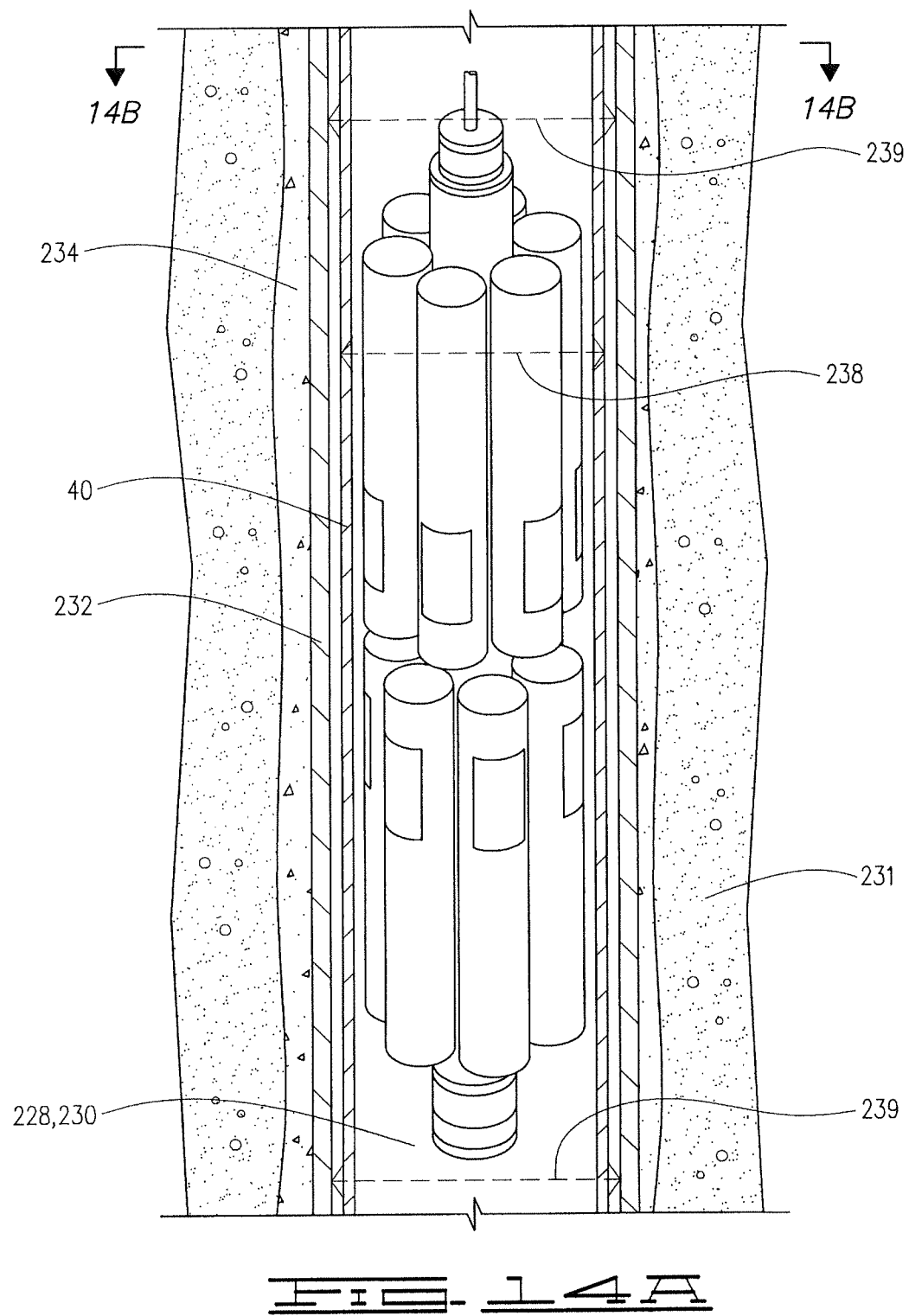
FIG. 14A is a perspective view of the embodiment of the passive cased well image logging tool assembly shown by FIGS. 4A and 4B in a wellbore.
Figure 14B:
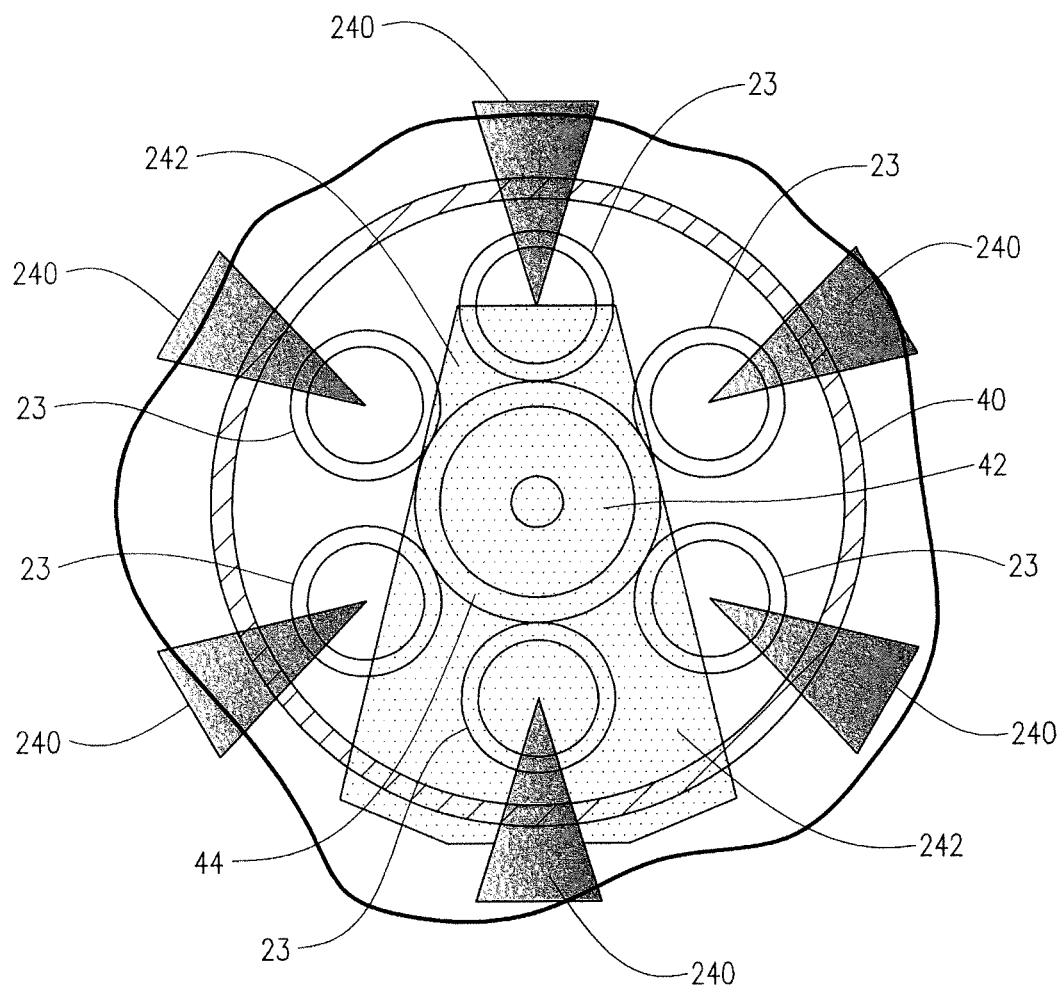
FIG. 14B is a cross-sectional view taken along the lines 14B-14B of FIG. 14A and further illustrating the focus areas of the sensors associated with the logging tool assembly disclosed herein and a "shadow zone" behind the sensors.

FIGS. 14A and 14B illustrate the passive cased well image logging tool assembly 10 shown by FIGS. 3A and 3B positioned downhole in a wellbore 228 that includes a borehole 230 and penetrates a subterranean formation 231. As shown, the wellbore 228 includes an annular casing 232 surrounded by an annular cement sheath 234. The annular cement sheath 234 surrounds the casing 232 and separates the casing 232 from the formation 231. For example, the casing 232 can be formed of metal. The outside diameter 238 of the logging tool assembly 10 is slightly less than the internal diameter 239 of the casing.

FIG. 14B illustrates the focus areas 240 of the sensors 16 of the sensor assemblies 23 associated with the logging tool assembly 10 and a "shadow zone" 242 behind each sensor. The focus areas 240 are primarily dictated by the size and angle associated with the windows 36 of the housings 24 of the sensor assemblies 23. The shadow zone 242 represents a shadow effect that the central core 42 of the logging tool assembly 10 can have on the arrangement of the sensor assemblies 23 and corresponding sensors 16. For example, when a sensor 16 on one side of the logging tool body 12 is receiving radiation, the central core 42 can totally block the sensor 16 on the opposing side of the logging tool body and thereby improve the signal-to-noise ratio.

FIG. 15 is a schematic view illustrating an example of use of the passive cased well image logging tool assembly 10 in accordance with one embodiment of the method disclosed herein. The logging tool assembly 10 is lowered into and pulled out of the wellbore 228 using a wireline cable 250 that is operated by a wireline or logging truck 252 in a manner that will be understood by those skilled in the art with the benefit of this disclosure. The attachment assembly 54 of the logging tool assembly 10 is attached to an end 254 of the wireline cable 250.

The annular casing 232 is cemented in place in the wellbore 230 to the total depth of the wellbore. The wellbore 228 is surrounded by a plurality of geologic units 260. As shown, the geologic units 260 include wet sand zones 260a, a shale zone 260b, a hydrocarbon-rich sand zone (pay zone) 260c, and a silty shale zone 260d. The geologic units 260 and the borehole 230 are traversed by a normal fault 262 (a geological event). Motion/fault direction arrows 264 illustrate the direction of motion associated with the normal fault 262.

As shown by the drawings, the sensor assemblies 23 are directly attached to the logging tool body 12. For example, the sensor assemblies can be attached to the inside surface 41b of the outer sheath 40 and/or the central core 42. The sensor assemblies 23 can be attached to the logging tool body 12 in other ways as well.

Once the logging tool assembly 10 is being lowered to the desired depth in the borehole 230, the logging process can be initiated. For example, the logging tool assembly 10 can be operated to begin the logging process by sending a signal through the wireline cable 250 to the tool assembly 10. The logging tool assembly 10 is pulled out of the borehole 230 by the wireline truck 252 and wireline cable 250 at a desired logging speed. While the tool assembly 10 is being pulled out of the borehole 230 at the desired logging speed, it collects gamma ray radiation data using a desired counting time at a desired sampling rate. For example, gamma rays naturally emitted by the formation come into the sensors 16 and impact the sensors. For example, when the sensors 16 are scintillation crystals, the gamma rays impact the crystals to create one or more flashes therein. The flashes are enhanced by the photomultiplier tubes 26. In other words, the photomultiplier tubes 26 amplify the sensor flashes to give better sensor readings. The data is corrected using data from the spatial positioning device 18 and otherwise processed in a manner that will be understood by those skilled in the art with the benefit of this disclosure. A well image log is then prepared based on the collected data.

Figure 16:
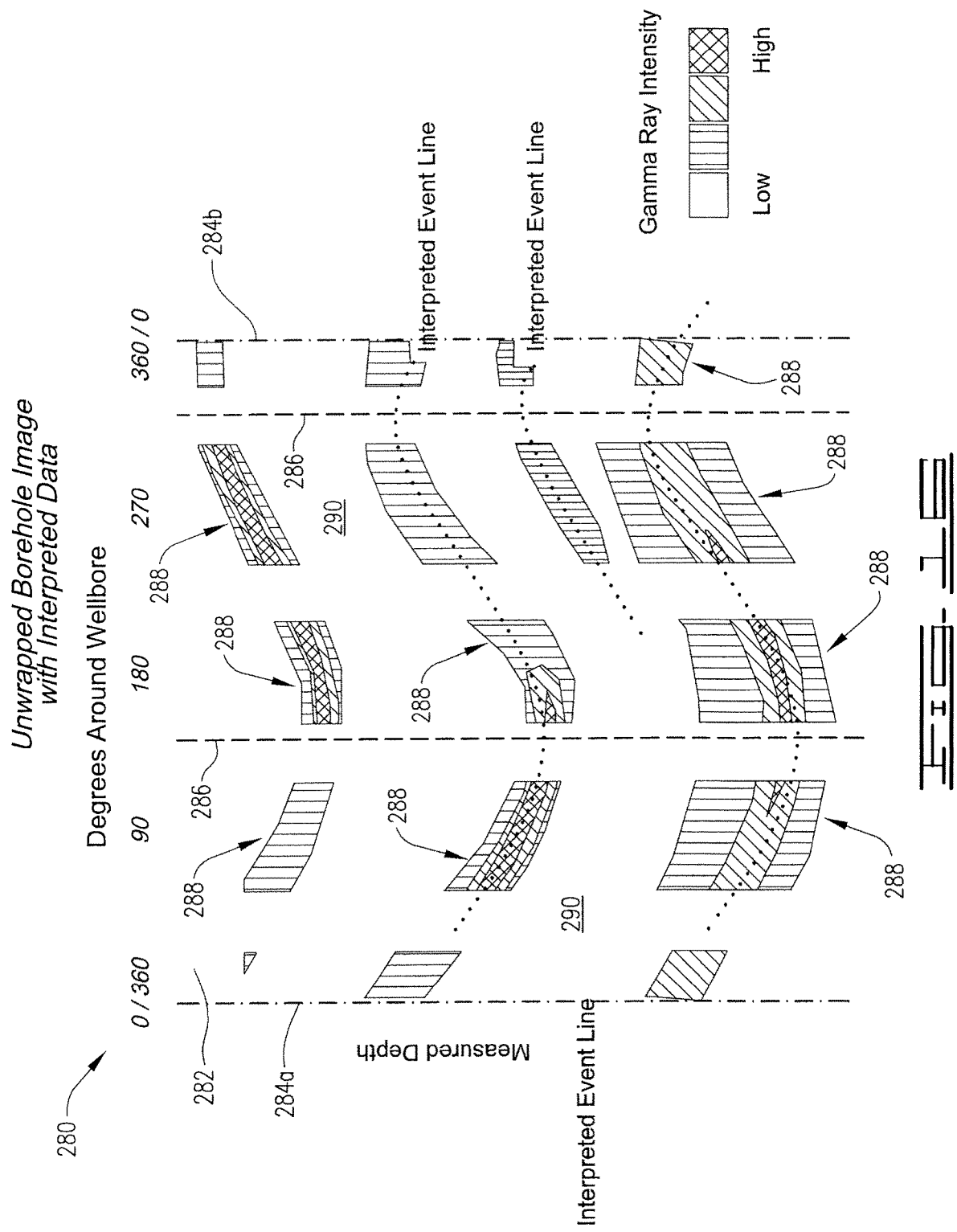
FIG. 16 is an example of a well log that can be generated using the method and passive cased well image logging tool assembly disclosed herein.

FIG. 16 is an example of a well image log 280 that can be created using the method and passive cased well logging tool assembly disclosed herein. As shown, the well image log 280 provides an unwrapped wellbore image 282 with interpreted data regarding the intensity of the gamma ray radiation at different points in the geologic units 260. Due to the fact the log 280 provides an "unwrapped view," what is seen on the 0/360 line 284a is also seen on the 360/0 line 284b. The image 282 includes structural axes 286 and several image tracks 288 across the borehole 230. Increasing the number of sensor assemblies 23 and sensors 16 on the logging tool assembly 10 will decrease the blank spaces 290 between the tracks 288. An increase in the internal diameter 239 of the casing 232 will widen the non-image tracks; however, for larger holes the tool may operate better if it includes additional sensor assemblies 23 and corresponding sensors 16. The final images can be used to interpret geologic events, boundaries, faults, fractures and dip and azimuth.

Thus, for example, in one embodiment, the method of creating a well image log of a cased well disclosed herein comprises: (a) providing a passive cased well image logging tool assembly, the logging tool assembly including: (1) an elongated logging tool body having a central longitudinal axis; a plurality of sensor assemblies attached to the logging tool body and equally spaced around the central longitudinal axis of logging tool body, each sensor assembly including: (i) a housing; (ii) a gamma ray radiation sensor contained by the housing, the sensor being capable of continuously collecting gamma ray radiation data from one or more geologic units surrounding or adjacent to the wellbore as the logging tool assembly is moved through the wellbore, wherein the gamma ray radiation sensor is a gamma ray radiation scintillation crystal; and (iii) a photomultiplier tube associated with the sensor, the photomultiplier tube having a central longitudinal axis, a first end, and a second end, wherein the sensor is attached to one end of the corresponding photomultiplier tube; and (2) at least one spatial positioning device attached to the logging tool body that is capable of continuously collecting sensor position data reflecting the xyz spatial position of the sensors in the wellbore relative to the wellbore and the Earth as the logging tool assembly is moved through the wellbore; (b) moving the logging tool assembly through at least a portion of the wellbore; (c) as the logging tool assembly is being moved through the wellbore, using the sensors to continuously collect gamma ray radiation data that is emitted by the geologic unit(s); (d) as the logging tool assembly is being moved through the wellbore, using the spatial positioning device to continuously collect sensor position data reflecting the xyz spatial position of the sensors within the wellbore relative to the wellbore and the Earth; (e) using the collected sensor position data to correct the collected gamma ray radiation data; (f) vertically sampling the corrected gamma ray radiation data; and (g) preparing a well image log based on the sampled gamma ray radiation data.

In another embodiment, the method of creating a well image log of a cased well disclosed herein comprises: (a) providing a passive cased well image logging tool assembly, the logging tool assembly including: (1) an elongated logging tool body having a central longitudinal axis; a plurality of sensor assemblies attached to the logging tool body and equally spaced around the central longitudinal axis of the logging tool body, each sensor assembly including: (i) a housing; (ii) a gamma ray radiation sensor contained by the housing, the sensor being capable of continuously collecting gamma ray radiation data from one or more geologic units surrounding or adjacent to the wellbore as the logging tool assembly is moved through the wellbore, wherein the gamma ray radiation sensor is a gamma ray radiation scintillation crystal; and (iii) a photomultiplier tube associated with the sensor, the photomultiplier tube having a central longitudinal axis, a first end, and a second end, wherein the sensor is attached to one end of the corresponding photomultiplier tube, wherein the gamma ray radiation sensors are linearly arranged and equally spaced around the central longitudinal axis of the logging tool body in two rows, wherein the gamma ray radiation sensors in each of the rows are arranged such that the ends of the photomultiplier tubes containing the sensors in one row face the ends of the photomultiplier tubes containing the sensors in the other row, and wherein the gamma ray radiation sensors in one of the rows are vertically aligned to the sensors in the other row; and (2) at least one spatial positioning device attached to the logging tool body that is capable of continuously collecting sensor position data reflecting the xyz spatial position of the sensors in the wellbore relative to the wellbore and the Earth as the logging tool assembly is moved through the wellbore; (b) moving the logging tool assembly through at least a portion of the wellbore; (c) as the logging tool assembly is being moved through the wellbore, using the sensors to continuously collect gamma ray radiation data that is emitted by the geologic unit(s); (d) as the logging tool assembly is being moved through the wellbore, using the spatial positioning device to continuously collect sensor position data reflecting the xyz spatial position of the sensors within the wellbore relative to the wellbore and the Earth; (e) using the collected sensor position data to correct the collected gamma ray radiation data; (f) vertically sampling the corrected gamma ray radiation data; and (g) preparing a well image log based on the sampled gamma ray radiation data.

In another embodiment, the method of creating a well image log of a cased well disclosed herein comprises: (a) providing a passive cased well image logging tool assembly, the logging tool assembly including: (1) an elongated logging tool body having a central longitudinal axis; a plurality of sensor assemblies attached to the logging tool body and equally spaced around the central longitudinal axis of the logging tool body, each sensor assembly including: (i) a housing; (ii) a gamma ray radiation sensor contained by the housing, the sensor being capable of continuously collecting gamma ray radiation data from one or more geologic units surrounding or adjacent to the wellbore as the logging tool assembly is moved through the wellbore, wherein the gamma ray radiation sensor is a gamma ray radiation scintillation crystal; and (iii) a photomultiplier tube associated with the sensor, the photomultiplier tube having a central longitudinal axis, a first end, and a second end, wherein the sensor is attached to one end of the corresponding photomultiplier tube, wherein the gamma ray radiation sensors are linearly arranged and equally spaced around the central longitudinal axis of the logging tool body in two rows, wherein the gamma ray radiation sensors in each of the rows are arranged such that the ends of the photomultiplier tubes containing the sensors in one row face the ends of the photomultiplier tubes containing the sensors in the other row, and wherein the gamma ray radiation sensors in one of the rows are vertically offset from the sensors in the other row; and (2) at least one spatial positioning device attached to the logging tool body that is capable of continuously collecting sensor position data reflecting the xyz spatial position of the sensors in the wellbore relative to the wellbore and the Earth as the logging tool assembly is moved through the wellbore; (b) moving the logging tool assembly through at least a portion of the wellbore; (c) as the logging tool assembly is being moved through the wellbore, using the sensors to continuously collect gamma ray radiation data that is emitted by the geologic unit(s); (d) as the logging tool assembly is being moved through the wellbore, using the spatial positioning device to continuously collect sensor position data reflecting the xyz spatial position of the sensors within the wellbore relative to the wellbore and the Earth; (e) using the collected sensor position data to correct the collected gamma ray radiation data; (f) vertically sampling the corrected gamma ray radiation data; and (g) preparing a well image log based on the sampled gamma ray radiation data.

In one embodiment, the passive cased well image logging tool assembly for use in a cased well disclosed herein comprises: (a) an elongated logging tool body having a central longitudinal axis; (b) a plurality of sensor assemblies attached to the logging tool body and equally spaced around the central longitudinal axis of the logging tool body, each sensor assembly including: (1) a housing; (2) a gamma ray radiation sensor contained by the housing, the sensor being capable of continuously collecting gamma ray radiation data from one or more geologic units surrounding or adjacent to the wellbore as the logging tool assembly is moved through the wellbore, wherein the gamma ray radiation sensor is a gamma ray radiation scintillation crystal; and (3) a photomultiplier tube associated with the sensor, the photomultiplier tube having a central longitudinal axis, a first end, and a second end, wherein the sensor is attached to one end of the corresponding photomultiplier tube, wherein the gamma ray radiation sensors are linearly arranged and equally spaced around the central longitudinal axis of the logging tool body in two rows, wherein the gamma ray radiation sensors in each of the rows are arranged such that the ends of the photomultiplier tubes containing the sensors in one row face the ends of the photomultiplier tubes containing the sensors in the other row, and wherein the gamma ray radiation sensors in one of the rows are vertically aligned to the sensors in the other row; and (c) at least one spatial positioning device attached to the logging tool body that is capable of continuously collecting sensor position data reflecting the xyz spatial position of the gamma ray radiation sensors in the wellbore relative to the wellbore and the Earth as the logging tool assembly is moved through the wellbore.

In another embodiment, the passive cased well image logging tool assembly for use in a cased well disclosed herein comprises: (a) an elongated logging tool body having a central longitudinal axis; (b) a plurality of sensor assemblies attached to the logging tool body and equally spaced around the central longitudinal axis of the logging tool body, each sensor assembly including: (1) a housing; (2) a gamma ray radiation sensor contained by the housing, the sensor being capable of continuously collecting gamma ray radiation data from one or more geologic units surrounding or adjacent to the wellbore as the logging tool assembly is moved through the wellbore, wherein the gamma ray radiation sensor is a gamma ray radiation scintillation crystal; and (3) a photomultiplier tube associated with the sensor, the photomultiplier tube having a central longitudinal axis, a first end, and a second end, wherein the sensor is attached to one end of the corresponding photomultiplier tube, wherein the gamma ray radiation sensors are linearly arranged and equally spaced around the central longitudinal axis of the logging tool body in two rows, wherein the gamma ray radiation sensors in each of the rows are arranged such that the ends of the photomultiplier tubes containing the sensors in one row face the ends of the photomultiplier tubes containing the sensors in the other row, and wherein the gamma ray radiation sensors in one of the rows are vertically offset from the sensors in the other row; and (c) at least one spatial positioning device attached to the logging tool body that is capable of continuously collecting sensor position data reflecting the xyz spatial position of the gamma ray radiation sensors in the wellbore relative to the wellbore and the Earth as the logging tool assembly is moved through the wellbore.

In another embodiment, the passive cased well image logging tool assembly for use in a cased well disclosed herein comprises: (a) an elongated logging tool body having a central longitudinal axis; (b) a plurality of sensor assemblies attached to the logging tool body and equally spaced around the central longitudinal axis of the logging tool body, each sensor assembly including: (1) a housing; (2) a gamma ray radiation sensor contained by the housing, the sensor being capable of continuously collecting gamma ray radiation data from one or more geologic units surrounding or adjacent to the wellbore as the logging tool assembly is moved through the wellbore, wherein the gamma ray radiation sensor is a gamma ray radiation scintillation crystal; and (3) a photomultiplier tube associated with the sensor, the photomultiplier tube having a central longitudinal axis, a first end, and a second end, wherein the sensor is attached to one end of the corresponding photomultiplier tube, wherein the gamma ray radiation sensors are vertically staggered and equally spaced around the central longitudinal axis of the logging tool body in two rows and wherein the gamma ray radiation sensors in each of the rows are arranged such that the ends of the photomultiplier tubes containing the sensors in one row face the ends of the photomultiplier tubes containing the sensors in the other row; and (c) at least one spatial positioning device attached to the logging tool body that is capable of continuously collecting sensor position data reflecting the xyz spatial position of the gamma ray radiation sensors in the wellbore relative to the wellbore and the Earth as the logging tool assembly is moved through the wellbore.

In another embodiment, the passive cased well image logging tool assembly for use in a cased well disclosed herein comprises: (a) an elongated logging tool body having a central longitudinal axis; (b) a plurality of sensor assemblies attached to the logging tool body and equally spaced around the central longitudinal axis of the logging tool body, each sensor assembly including: (1) a housing; (2) a gamma ray radiation sensor contained by the housing, the sensor being capable of continuously collecting gamma ray radiation data from one or more geologic units surrounding or adjacent to the wellbore as the logging tool assembly is moved through the wellbore, wherein the gamma ray radiation sensor is a gamma ray radiation scintillation crystal; and (3) a photomultiplier tube associated with the sensor, the photomultiplier tube having a central longitudinal axis, a first end, and a second end, wherein the sensor is attached to one end of the corresponding photomultiplier tube, wherein the gamma ray radiation sensors are helically arranged and equally spaced around the central longitudinal axis of the logging tool body in two rows and wherein the gamma ray radiation sensors in each of the rows are arranged such that the ends of the photomultiplier tubes containing the sensors in one row face the ends of the photomultiplier tubes containing the sensors in the other row; and (c) at least one spatial positioning device attached to the logging tool body that is capable of continuously collecting sensor position data reflecting the xyz spatial position of the gamma ray radiation sensors in the wellbore relative to the wellbore and the Earth as the logging tool assembly is moved through the wellbore.

Many advantages are achieved by the method and logging tool assembly disclosed herein. For example, the increased number of sensors 16 and specific arrangements thereof on the logging tool body 12 increase the quality of the data collected and provided by the tool. The various arrangements of the sensor assemblies 23 and corresponding sensors 16 disclosed herein allow additional sensor points to be calculated, which further increases the quality of the data collected and provided by the tool. Also, the various arrangements of the sensor assemblies 23 and corresponding sensors 16 allow larger sensors, including larger scintillation crystals, to be used which means more accurate data is provided by the logging tool assembly 10. Statistics and spatial calculations are improved, the signal-to-noise ratio is increased, the position of incoming signals can be more precisely calculated, and a better image of the borehole wall can be created. For example, by having the sensors 16 placed in basically a parallelogram shape (for example, in connection with the helical arrangements of sensors), the number of interpolated points between the sensors can be increased. For example, actual data points from six actual sensors 16 can be combined with nine calculated data points (interpolated points). The various arrangements of the sensor assemblies 23 and sensors 16 disclosed herein also allow the size of the crystals to be as large as possible.

The ultimate goal of any image logging tool is to get an accurate representation of characteristics of the geologic units surrounding the wellbore. By using the passive well image logging tool assembly disclosed herein in accordance with the disclosed method, a highly oriented logging survey can be conducted to collect useful wellbore and geologic unit data. For example, by combining a low logging speed with the minimum offset produced by multiple radially arranged radiation sensor assemblies biased against the inner wall of the wellbore casing, and eliminating interference by mud filter cake, drilling fluid and other factors that are present in an open-hole environment, better data can be collected in accordance with the disclosed method with a higher S/N ratio, which allows for the acquisition of more useable data resulting in an improved image and interpretation.

By detecting and receiving gamma ray radiation data emitted from geologic units surrounding or adjacent to the wellbore and using such data to generate a well image log, the method disclosed herein has many advantages over micro-resistivity, acoustical, optical and other image logging methods used heretofore. For example, using naturally-occurring gamma ray radiation data emitted from geologic units to derive the needed information allows a passive cased well logging tool to be used in a cased wellbore. Gamma ray radiation data (for example, from naturally occurring gamma rays or injected tracer gamma rays) can be collected without emitting any signal from the well logging tool assembly through the wellbore casing into the surrounding geologic units. As a result, the regulatory issues associated with using an active-source image logging tool assembly and the tremendous problems that can result if such a tool gets stuck (e.g., due to hole rugosity, differential pressure sticking, wellbore deviations or "dog-legs," and/or other material in the wellbore) can be avoided.

Perhaps most importantly, using naturally occurring gamma ray radiation data emitted from geologic units penetrated by the wellbore to derive the needed information allows the method disclosed herein to be carried out and the image logging tool disclosed herein to be used in connection with wellbores that have already been cased, for example, many years ago. For example, metal, plastic and composite casings do not interfere with naturally occurring gamma ray radiation transmitted from the geologic units through the wellbore to the image logging tool assembly disclosed herein. This creates numerous advantages over methods and well logging tool assemblies that directly measure the conductivity/resistivity or acoustic or optical properties of materials in the geologic units and therefore cannot be used in a cased well.

The method and image logging tool assembly disclosed herein can be used to create a well image log in a variety of different applications. For example, if a portion of the wellbore must be cased during the process of drilling a well (for example, due to unstable conditions caused by an unconsolidated zone), the well operator can 1) stop drilling, 2) pull the drilling bit assembly out of the hole, 3) run a "protective" casing string across the problem zone, 4) use the method and image logging tool assembly disclosed herein to log across that casing string, 5) run the drilling bit assembly back to the bottom of the newly cased hole, and 6) continue drilling. As another example, the method and image well logging tool assembly disclosed herein can be used in connection with active and inactive cased wells, and temporarily abandoned cased wells, including cased wells drilled decades ago and for which a well image log is not available. For example, the potential viability of an abandoned well for further production or re-drilling using new technology can now be evaluated. Cased wells in use or used in the past as water production wells and waste disposal wells can also be effectively evaluated.

For example, with the method and cased well image logging tool assembly disclosed herein, there are no problems due to mud-cake build up on the borehole wall, high formation fluid invasion into the surrounding rock unit, or the type of drilling fluid used in the wellbore. In most cases, because the well has already been cased, the high cost of having a drilling rig in place is not a factor. The fear that the wellbore will collapse or cave in is not a factor, which allows the data to be selectively collected at more optimal or non-critical times, thus further reducing costs and risks. The fear that the well logging tool will get stuck due to the shape and rugosity of the hole is not a factor. As a result, the needed data can be collected at a relatively slow logging speed and/or higher sampling rate as compared to the logging speed and/or sampling rate that is used in connection with other methods and well logging tools that are typically used in an open-hole environment.

In fact, the naturally occurring gamma ray radiation emitted by the rock and other elements in a geologic unit penetrated by the wellbore can be more accurately collected at a lower logging speed. For example, a gamma ray signal event boundary between sand and shale can be more accurately defined at a lower logging speed. The ability to collect the needed data at a relatively slow speed, for example, a speed no greater than 750 FPH, allows the data to be collected in accordance with the method and well logging tool disclosed herein in a manner that provides, for example, increased bed definition. This can be done without having to equip the well logging tool with a large number of highly sophisticated sensor assemblies and signal processors. As a result, the passive cased well image logging tool assembly disclosed herein does not have to be as robust, sophisticated or expensive as other well logging tools that are used in an open-hole environment and must consequently be operated at significantly higher logging speeds.

The S/N ratio associated with the method and passive cased well image logging tool assembly disclosed herein is significantly improved by using the tool assembly in a cased hole environment, by decreasing the logging speed and thereby increasing the sampling rate associated with the tool assembly. The S/N ratio associated with the method and passive cased well image tool assembly disclosed herein can be further improved by increasing the number of gamma ray radiation sensor assemblies attached to the tool assembly, using one or more gyroscopes to spatially correct the data collected by the tool assembly, radially aligning radiation sensor assemblies around the tool assembly to increase the coverage of surrounding geologic units, positioning the sensor assemblies in a more optimal pattern, and biasing the sensor assemblies against the interior surface of the casing by using extendable arms.

The fact that the method and tool assembly disclosed herein can be used in a cased well avoids the time constraints and costs associated with having a drilling rig in place and the limitations of an unstable wellbore or other conditions. Thus, the method and tool assembly can be safely used at a time when operational costs are less, time is more available and when the wellbore is not in danger of collapsing.

The method and tool assembly disclosed herein can be used to assess older cased wellbores, including horizontal wells, for possible re-drill and/or recompletion. The method and tool add value to wells that have been stimulated by fracturing and/or acidizing techniques by providing the ability to qualitatively evaluate the stimulation results and identify any uncompleted pay zones or potential accumulations accessed by re-drilling.

Therefore, the present method and logging tool assembly are well adapted to attain the ends and advantages mentioned, as well as those that are inherent therein. The particular examples disclosed above are illustrative only, as the present method and logging tool assembly may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While the method and logging tool assembly are described in terms of "comprising," "containing," "having," or "including" various components or steps, the method and logging tool assembly can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of creating a well image log of a cased well, comprising:
   providing a passive cased well image logging tool assembly, said logging tool assembly including:
      an elongated logging tool body having a central longitudinal axis;
      a plurality of gamma ray radiation sensors attached to said logging tool body and spaced around said central longitudinal axis of said logging tool body, each gamma ray radiation sensor being capable of continuously collecting gamma ray radiation data from one or more geologic units surrounding or adjacent to the wellbore as said logging tool assembly is moved through the wellbore; and
      at least one spatial positioning device attached to said logging tool body that is capable of continuously collecting sensor position data reflecting the xyz spatial position of said gamma ray radiation sensors in the wellbore relative to the wellbore and the Earth as said logging tool assembly is moved through the wellbore;
   moving said logging tool assembly through at least a portion of the wellbore;
   as said logging tool assembly is being moved through the wellbore, using said gamma ray radiation sensors to continuously collect gamma ray radiation data that is emitted by the geologic unit(s);
   as said logging tool assembly is being moved through the wellbore, using said spatial positioning device to continuously collect sensor position data reflecting the xyz spatial position of said gamma ray radiation sensors within the wellbore relative to the wellbore and the Earth;
   using said collected sensor position data to correct said collected gamma ray radiation data;
   sampling said corrected gamma ray radiation data, wherein said gamma radiation sensors are positioned relative to each other so that said sampling said corrected gamma ray radiation data produces, at each of a plurality of sampling intervals, an area measurement comprising recorded points and calculated points, wherein said calculated points are produced from measurements of gamma radiation collected at two or more of said recorded points; and
   preparing a well image log based on said sampled gamma ray radiation data.

2. The method of claim 1, wherein said gamma ray radiation sensors are attached to said logging tool body and equally spaced around said central longitudinal axis of said logging tool body.

3. The method of claim 1, wherein each of said sensors is a scintillation crystal.

4. The method of claim 1, wherein a sufficient number of gamma ray radiation sensors are attached to said logging tool body and equally spaced around said central longitudinal axis of said logging tool body to allow gamma ray radiation data to be collected at sufficient points around the circumference of the wellbore for said image log to be prepared, wherein said image log is of an entire geologic unit surrounding the wellbore.

5. The method of claim 1, wherein said logging tool body further includes an outer sheath, and wherein said gamma ray radiation sensors are positioned within said outer sheath.

6. The method of claim 1, wherein said logging tool assembly further comprises a central core positioned along said central longitudinal axis of said logging tool body between said central longitudinal axis of said logging tool body and said sensors, said central core including a gamma ray shielding material.

7. The method of claim 1, wherein said gamma ray radiation sensors are linearly arranged and spaced around said central longitudinal axis of said logging tool body in at least one row.

8. The method of claim 7, wherein said gamma ray radiation sensors are linearly arranged and equally spaced around said central longitudinal axis of said logging tool body in two rows with each row having multiple sensors.

9. The method of claim 8, wherein said gamma ray radiation sensors in one of said rows are vertically aligned to the sensors in the other row.

10. The method of claim 8, wherein said gamma ray radiation sensors in one of said rows are vertically offset from the sensors in the other row.

11. The method of claim 1, wherein said gamma ray radiation sensors are vertically staggered and spaced around said central longitudinal axis of said logging tool body in at least one row.

12. The method of claim 11, wherein said gamma ray radiation sensors are vertically staggered and equally spaced around said central longitudinal axis of said logging tool body in two rows with each row having multiple sensors.

13. The method of claim 1, wherein said gamma ray radiation sensors are helically arranged and spaced around said central longitudinal axis of said logging tool body in at least one row.

14. The method of claim 13, wherein said gamma ray radiation sensors are helically arranged and equally spaced around said central longitudinal axis of said logging tool body in two rows with each row having multiple sensors and wherein each of said at least two rows is helical.

15. The method of claim 1, wherein said logging tool assembly includes at least two sets of gamma ray radiation sensors, wherein for each set, said sensors are positioned relative to the other sensors in the set so as to collect gamma ray radiation in an areal array of recorded points, and said gamma ray radiation sensors in each set are attached to said logging tool body and equally spaced around said central longitudinal axis of said logging tool body, and wherein the sets are spaced from each other along said central longitudinal axis of said logging tool body.

16. The method of claim 1, wherein said logging tool assembly includes a first set and a second set of gamma ray radiation sensors, wherein for each set, said sensors are positioned relative to the other sensors in the set so as to collect gamma ray radiation in an areal array of recorded points, and said gamma ray radiation sensors are helically arranged and equally spaced around said central longitudinal axis of said logging tool body in at least two rows in each set.

17. The method of claim 16, wherein said gamma ray radiation sensors are helically arranged to form a two-row right-handed helical arrangement around said central longitudinal axis of said logging tool body in each set.

18. The method of claim 16, wherein said gamma ray radiation sensors in said first set are helically arranged to form a right-handed helical arrangement around said central longitudinal axis of said logging tool body, and said gamma ray radiation sensors in said second set are helically arranged to form a left-handed helical arrangement around said central longitudinal axis of said logging tool body.

19. The method of claim 1, wherein said logging tool assembly is moved through at least a portion of the wellbore at a logging speed of no greater than 750 feet per hour.

20. The method of claim 1, wherein said corrected gamma ray radiation data is vertically sampled at a vertical distance sampling rate of once every vertical distance sampling interval, wherein said vertical distance sampling interval is no greater than six inches.

21. The method of claim 1, wherein said cased well is an inactive or permanently abandoned well.

22. The method of claim 21, wherein said cased well is an inactive or permanently abandoned well for which there is no prior well image log.

23. A method of creating a well image log of a cased well, comprising:
  providing a passive cased well image logging tool assembly, said logging tool assembly including:
    an elongated logging tool body having a central longitudinal axis;
    a plurality of sensor assemblies attached to said logging tool body and equally spaced around said central longitudinal axis of said logging tool body, each sensor assembly being positioned within said logging tool body and including:
      a housing;
      a gamma ray radiation sensor contained by said housing, said sensor being capable of continuously collecting gamma ray radiation data from one or more geologic units surrounding or adjacent to the wellbore as said logging tool assembly is moved through the wellbore, wherein said gamma ray radiation sensor is a gamma ray radiation scintillation crystal; and
      a photomultiplier tube associated with said sensor, said photomultiplier tube having a central longitudinal axis, a first end, and a second end, wherein said sensor is attached to one end of said corresponding photomultiplier tube; and
    at least one spatial positioning device attached to said logging tool body that is capable of continuously collecting sensor position data reflecting the xyz spatial position of said sensors in the wellbore relative to the wellbore and the Earth as said logging tool assembly is moved through the wellbore; and
  moving said logging tool assembly through at least a portion of the wellbore;
  as said logging tool assembly is being moved through the wellbore, using said sensors to continuously collect gamma ray radiation data that is emitted by the geologic unit(s);
  as said logging tool assembly is being moved through the wellbore, using said spatial positioning device to continuously collect sensor position data reflecting the xyz spatial position of said sensors within the wellbore relative to the wellbore and the Earth;
  using said collected sensor position data to correct said collected gamma ray radiation data;
  vertically sampling said corrected gamma ray radiation data, wherein said sensor assemblies are positioned relative to each other so that said sampling said corrected gamma ray radiation data produces, at each of a plurality of sampling intervals, an area measurement comprising recorded points and calculated points, wherein said calculated points are produced from measurements of gamma radiation collected at two or more of said recorded points; and
  preparing a well image log based on said sampled gamma ray radiation data.

24. The method of claim 23, wherein both said sensor and said photomultiplier tube are contained by said housing.

25. The method of claim 23, wherein said logging tool body further includes an outer sheath, and wherein said sensor assemblies are positioned within said outer sheath.

26. The method of claim 25, wherein said logging tool assembly further comprises a central core positioned within said outer sheath along said central longitudinal axis of said logging tool body between said central longitudinal axis of said logging tool body and said sensor assemblies, said central core including a gamma ray shielding material.

27. The method of claim 23, wherein said sensor assemblies are linearly arranged and equally spaced around said central longitudinal axis of said logging tool body in at least one row.

28. The method of claim 27, wherein said sensor assemblies are linearly arranged and equally spaced around said central longitudinal axis of said logging tool body in two rows with each row having multiple sensor assemblies.

29. The method of claim 23, wherein said sensor assemblies are vertically staggered around said central longitudinal axis of said logging tool body in at least one row.

30. The method of claim 23, wherein said sensor assemblies are vertically staggered and equally spaced around said central longitudinal axis of said logging tool body in two rows with each row having multiple sensor assemblies.

31. The method of claim 23, wherein said sensor assemblies are helically arranged around said central longitudinal axis of said logging tool body in at least one row.

32. The method of claim 31, wherein said sensor assemblies are helically arranged and equally spaced around said central longitudinal axis of said logging tool body in two rows with each row having multiple sensor assemblies and wherein each of said at least two rows is helical.

33. A passive cased well image logging tool assembly for use in a cased well, comprising:
  an elongated logging tool body having a central longitudinal axis;
  a plurality of gamma ray radiation sensors attached to said logging tool body and spaced around said central longitudinal axis of said logging tool body, each gamma ray radiation sensor being capable of continuously collecting gamma ray radiation data from one or more geologic units surrounding or adjacent to the wellbore as said logging tool assembly is moved through the wellbore;

at least one spatial positioning device attached to said logging tool body that is capable of continuously collecting sensor position data reflecting the xyz spatial position of said gamma ray radiation sensors in the wellbore relative to the wellbore and the Earth as said logging tool assembly is moved through the wellbore; and a signal processing unit configured to sample gamma ray radiation data, wherein said gamma ray radiation sensors are positioned relative to each other so that said sampling produces, at each of a plurality of sampling intervals, an area measurement comprising recorded points and calculated points, wherein said calculated points are produced from measurements of gamma radiation collected at two or more of said recorded points.

34. The tool assembly of claim 33, wherein said gamma ray radiation sensors are attached to said logging tool body and equally spaced around said central longitudinal axis of said logging tool body.

35. The tool assembly of claim 33, wherein each of said sensors is a scintillation crystal.

36. The method of claim 33, wherein said logging tool body further includes an outer sheath, and wherein said gamma ray radiation sensors are positioned within said outer sheath.

37. The method of claim 33, wherein said logging tool assembly further comprises a central core positioned along said central longitudinal axis of said logging tool body between said central longitudinal axis of said logging tool body and said sensors, said central core including a gamma ray shielding material.

38. The tool assembly of claim 33, wherein said gamma ray radiation sensors are linearly arranged and equally spaced around said central longitudinal axis of said logging tool body in at least one row.

39. The tool assembly of claim 38, wherein said gamma ray radiation sensors are linearly arranged and equally spaced around said central longitudinal axis of said logging tool body in two rows with each row having multiple sensors.

40. The tool assembly of claim 38, wherein said gamma ray radiation sensors in one of said rows are vertically aligned to the sensors in the other row.

41. The tool assembly of claim 38, wherein said gamma ray radiation sensors in one of said rows are vertically offset from the sensors in the other row.

42. The tool assembly of claim 33, wherein said gamma ray radiation sensors are vertically staggered and equally spaced around said central longitudinal axis of said logging tool body in at least one row.

43. The tool assembly of claim 42, wherein said gamma ray radiation sensors are vertically staggered and equally spaced around said central longitudinal axis of said logging tool body in two rows with each row having multiple sensors.

44. The tool assembly of claim 33, wherein said gamma ray radiation sensors are helically arranged and equally spaced around said central longitudinal axis of said logging tool body in at least one row.

45. The tool assembly of claim 44, wherein said gamma ray radiation sensors are helically arranged and equally spaced around said central longitudinal axis of said logging tool body in two rows with each row having multiple sensors and wherein each of said at least two rows is helical.

46. A passive cased well image logging tool assembly for use in a cased well, comprising:

an elongated logging tool body having a central longitudinal axis;

a plurality of sensor assemblies attached to said logging tool body and equally spaced around said central longitudinal axis of said logging tool body, each sensor assembly being positioned within said logging tool body and including:

a housing;

a gamma ray radiation sensor contained by said housing, said sensor being capable of continuously collecting gamma ray radiation data from one or more geologic units surrounding or adjacent to the wellbore as said logging tool assembly is moved through the wellbore, wherein said gamma ray radiation sensor is a gamma ray radiation scintillation crystal; and a photomultiplier tube associated with said sensor, said photomultiplier tube having a central longitudinal axis, a first end, and a second end, wherein said sensor is attached to one end of said corresponding photomultiplier tube;

at least one spatial positioning device attached to said logging tool body that is capable of continuously collecting sensor position data reflecting the xyz spatial position of said gamma ray radiation sensors in the wellbore relative to the wellbore and the Earth as said logging tool assembly is moved through the wellbore; and a signal processing unit configured to sample gamma ray radiation data, wherein said sensor assemblies are positioned relative to each other so that said sampling, produces at each of a plurality of sampling intervals, an area measurement comprising recorded points and calculated points, wherein said calculated points are produced from measurements of gamma radiation collected at two or more of said recorded points.

47. The tool assembly of claim 46, wherein said logging tool body further includes an outer sheath, and wherein said sensor assemblies are positioned within said outer sheath.

48. The tool assembly of claim 47, wherein said logging tool assembly further comprises a central core positioned within said outer sheath along said central longitudinal axis of said logging tool body between said central longitudinal axis of said logging tool body and said sensor assemblies, said central core including a gamma ray shielding material.

49. The tool assembly of claim 48, wherein said sensor assemblies are linearly arranged and equally spaced around said central longitudinal axis of said logging tool body in at least one row.

50. The tool assembly of claim 49, wherein sensor assemblies are linearly arranged and equally spaced around said central longitudinal axis of said logging tool body in two rows with each row having multiple sensor assemblies.

51. The tool assembly of claim 48, wherein sensor assemblies are vertically staggered and equally spaced around said central longitudinal axis of said logging tool body in at least one row.

52. The tool assembly of claim 51, wherein said sensor assemblies are vertically staggered and equally spaced around said central longitudinal axis of said logging tool body in two rows with each row having multiple sensor assemblies.

53. The tool assembly of claim 48, wherein said sensor assemblies are helically arranged and equally spaced around said central longitudinal axis of said logging tool body in at least one row.

54. The tool assembly of claim 53, wherein said sensor assemblies are helically arranged and equally spaced around said central longitudinal axis of said logging tool body in two rows with each row having multiple sensors and wherein each of said at least two rows is helical.

* * * * *